US012560677B2

(12) United States Patent (10) Patent No.: US 12,560,677 B2
Sekiya (45) Date of Patent: Feb. 24, 2026

(54) RADAR SYSTEM, DATA TRANSFER DEVICE, AND METHOD

(71) Applicant: KABUSHIKI KAISHA TOSHIBA, Tokyo (JP)

(72) Inventor: Ryota Sekiya, Kamakura Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 413 days.

(21) Appl. No.: 18/179,514

(22) Filed: Mar. 7, 2023

(65) Prior Publication Data

US 2024/0036155 A1 Feb. 1, 2024

(30) Foreign Application Priority Data

Jul. 26, 2022 (JP) ................................. 2022-118787

(51) Int. Cl.
*G01S 7/00* (2006.01)
*G01S 7/03* (2006.01)
*G01S 7/35* (2006.01)

(52) U.S. Cl.
CPC ................ *G01S 7/003* (2013.01); *G01S 7/03* (2013.01); *G01S 7/352* (2013.01)

(58) Field of Classification Search
CPC ............. G01S 7/003; G01S 7/03; G01S 7/352
USPC ....................................................... 342/195
See application file for complete search history.

(56) References Cited

U.S. PATENT DOCUMENTS

| | | | | |
|---|---|---|---|---|
| 5,056,112 | A | 10/1991 | Wei | |
| 7,880,672 | B1 * | 2/2011 | Doerry | G01S 13/282 |
| | | | | 342/201 |
| 9,031,163 | B2 * | 5/2015 | Matsuo | H04L 1/0033 |
| | | | | 375/299 |
| 10,051,414 | B1 * | 8/2018 | Omer | G01S 13/56 |
| 10,386,470 | B2 * | 8/2019 | Zivkovic | G01S 13/931 |

(Continued)

FOREIGN PATENT DOCUMENTS

| | | | | |
|---|---|---|---|---|
| JP | 2644382 | B2 * | 8/1997 | H04L 1/02 |
| JP | 2020204513 | A | 12/2020 | |

(Continued)

OTHER PUBLICATIONS

Toker, et al., "A Python Based Testbed for Real-Time Testing and Visualization using TI's 77 GHz Automotive Radars", 2019 IEEE Vehicular Networking Conference(VNC), 2019, pp. 1-4.

(Continued)

*Primary Examiner* — Nuzhat Pervin
(74) *Attorney, Agent, or Firm* — Holtz, Holtz & Volek PC

(57) ABSTRACT

According to one embodiment, a radar device includes a transmitter antenna that transmits a radar signal, a receiver antenna that receives a radar echo, an acquisition unit that acquires a plurality of pieces of first observation data having continuity, a first conversion unit that converts the pieces of first observation data into a plurality of pieces of second observation data having discontinuity, and a transfer unit that transfers the pieces of second observation data. The processing device includes a second conversion unit that converts the pieces of second observation data into the pieces of first observation data, and a processing unit that executes arithmetic processing using the pieces of first observation data.

14 Claims, 17 Drawing Sheets

(56) References Cited

U.S. PATENT DOCUMENTS

| | | | | |
|---|---|---|---|---|
| 11,422,230 | B2 * | 8/2022 | Bogner | G01S 13/42 |
| 11,456,792 | B1 * | 9/2022 | Comberiate | H04B 1/123 |
| 11,693,106 | B2 * | 7/2023 | Lang | G01S 13/931 |
| | | | | 342/109 |
| 11,921,196 | B2 * | 3/2024 | Kitsukawa | G01S 13/931 |
| 2014/0030988 | A1 * | 1/2014 | Fu | H04B 17/318 |
| | | | | 455/73 |
| 2014/0269857 | A1 * | 9/2014 | Rimini | H04B 1/1036 |
| | | | | 375/285 |
| 2015/0206330 | A1 * | 7/2015 | Takechi | H04W 4/024 |
| | | | | 345/629 |
| 2015/0302622 | A1 * | 10/2015 | Takechi | G01C 21/20 |
| | | | | 345/629 |
| 2018/0120419 | A1 * | 5/2018 | Bialer | G01S 13/931 |
| 2019/0129003 | A1 * | 5/2019 | Longman | G01S 7/35 |
| 2019/0181964 | A1 * | 6/2019 | Christoffers | H04B 17/19 |
| 2020/0209386 | A1 * | 7/2020 | Yoshimi | G01W 1/10 |
| 2020/0351576 | A1 * | 11/2020 | Beg | H04W 4/029 |
| 2020/0393594 | A1 * | 12/2020 | Obata | G06V 40/10 |
| 2021/0072350 | A1 * | 3/2021 | Loesch | G01S 13/343 |
| 2021/0127088 | A1 * | 4/2021 | Brandhuber | H04N 7/084 |
| 2021/0149019 | A1 * | 5/2021 | Subburaj | G01S 7/40 |
| 2021/0286066 | A1 * | 9/2021 | Bharadwaj | G01S 13/343 |
| 2021/0325531 | A1 * | 10/2021 | Kitsukawa | G01S 7/354 |
| 2022/0070710 | A1 * | 3/2022 | Lim | H04W 72/04 |
| 2022/0128648 | A1 * | 4/2022 | Li | G01S 7/352 |
| 2022/0349992 | A1 * | 11/2022 | Tsutsumi | G01S 7/4069 |

FOREIGN PATENT DOCUMENTS

| | | | | | |
|---|---|---|---|---|---|
| JP | 2021524036 | A * | 9/2021 | | G01S 7/4008 |
| WO | WO-2008021815 | A1 * | 2/2008 | | H04B 1/123 |
| WO | WO-2012050864 | A1 * | 4/2012 | | H03F 1/32 |

OTHER PUBLICATIONS

Lager, et al., "Interleaved Array Antennas for FMCW Radar Applications", IEEE Transactions on Antennas and Propagation (vol. 57, No. 8), 2009, pp. 2486-2490, DOI: 10.1109/TAP.2009.2024573.

Japanese Office Action (and an English language translation thereof) dated Aug. 5, 2025, issued in counterpart Japanese Application No. 2022-118787.

* cited by examiner

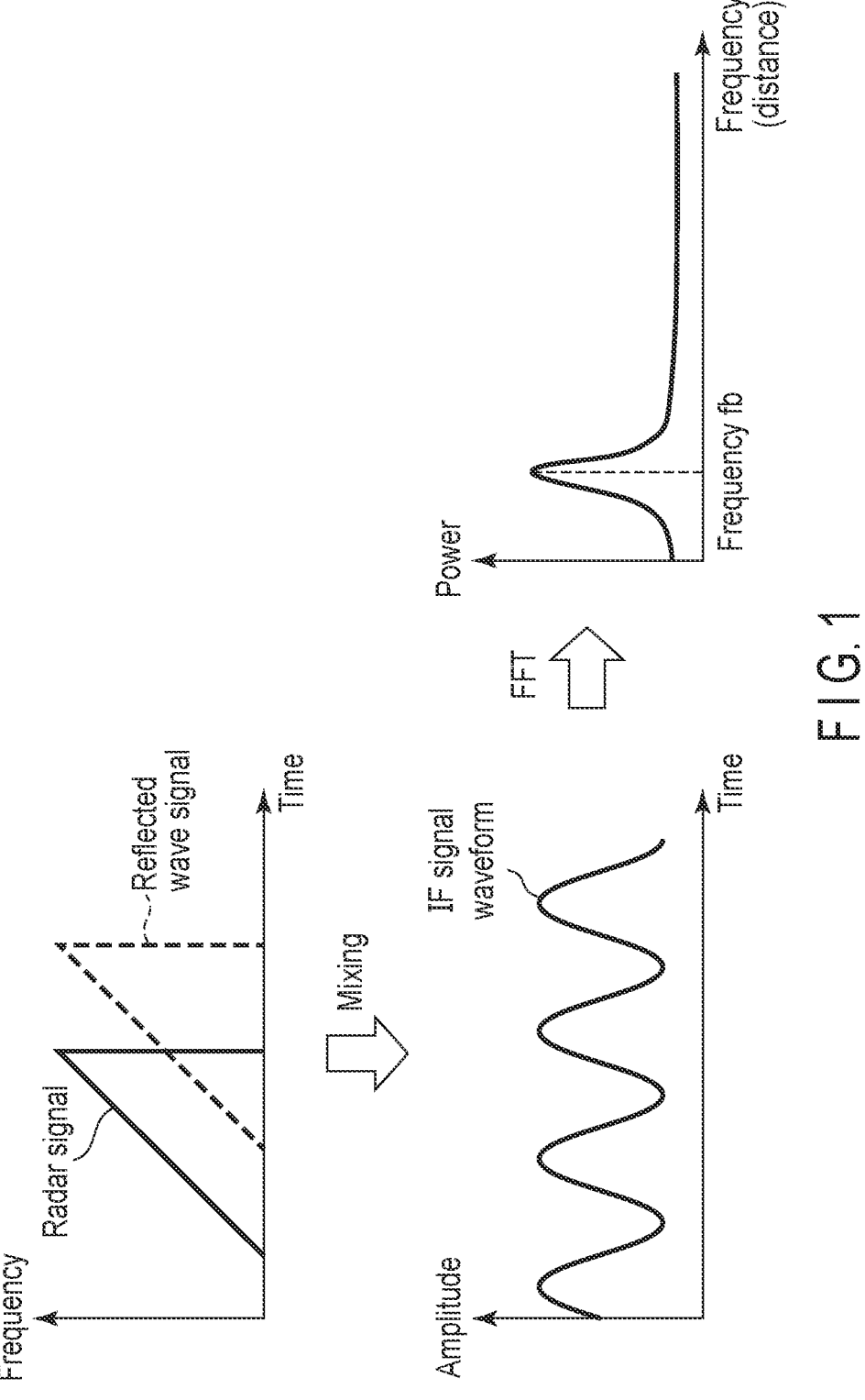
F I G. 1

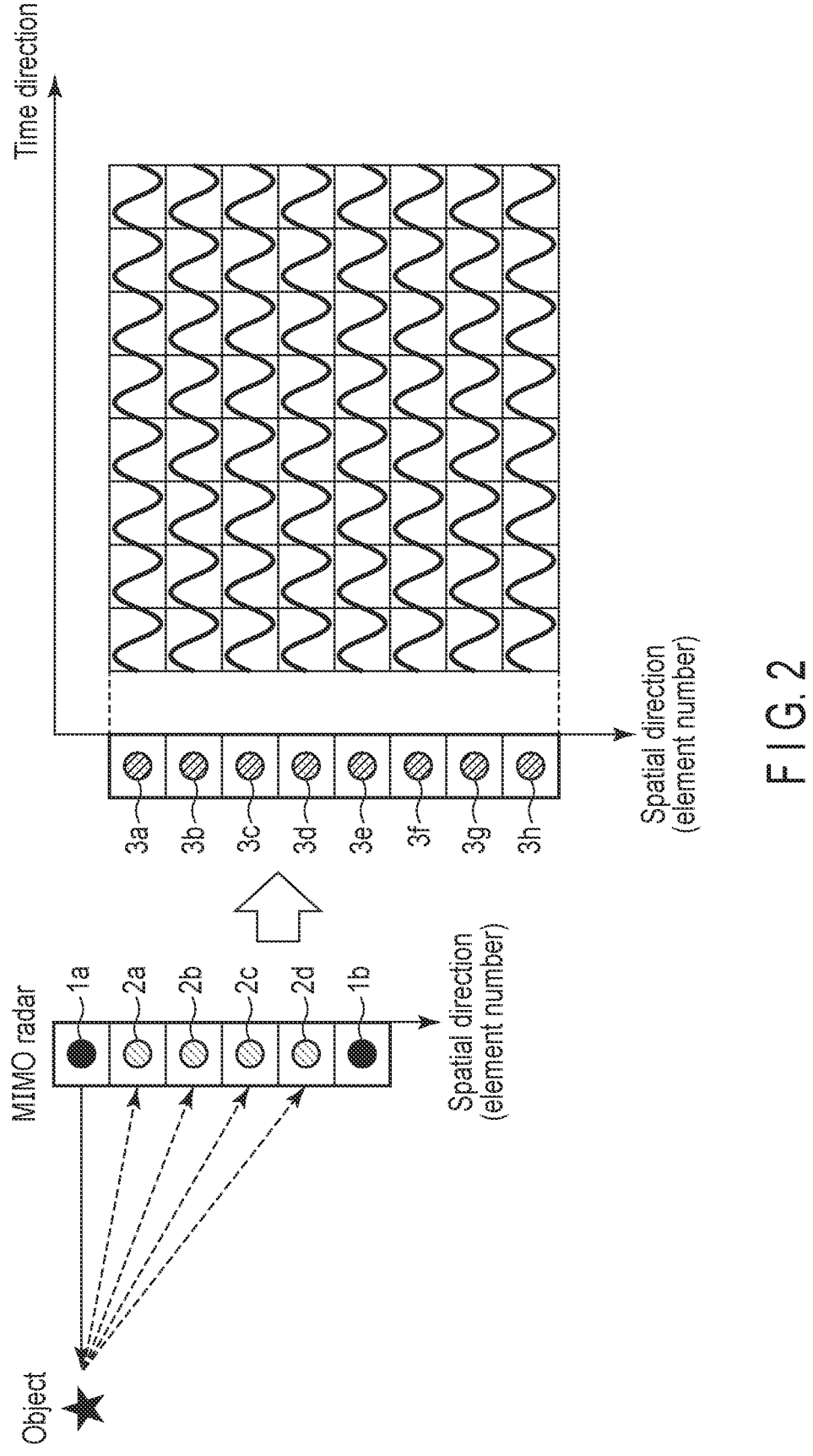
F I G. 2

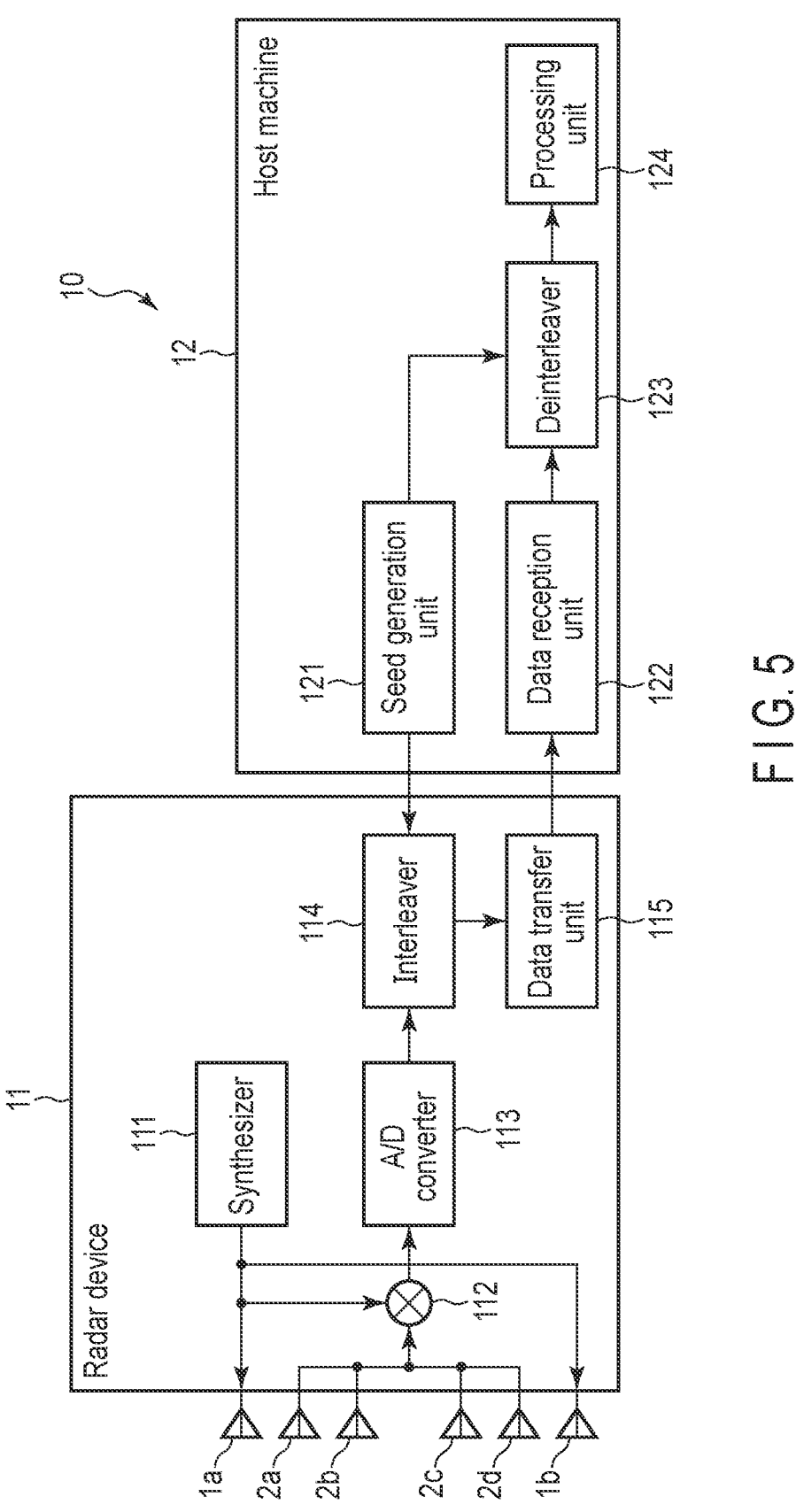
F I G. 5

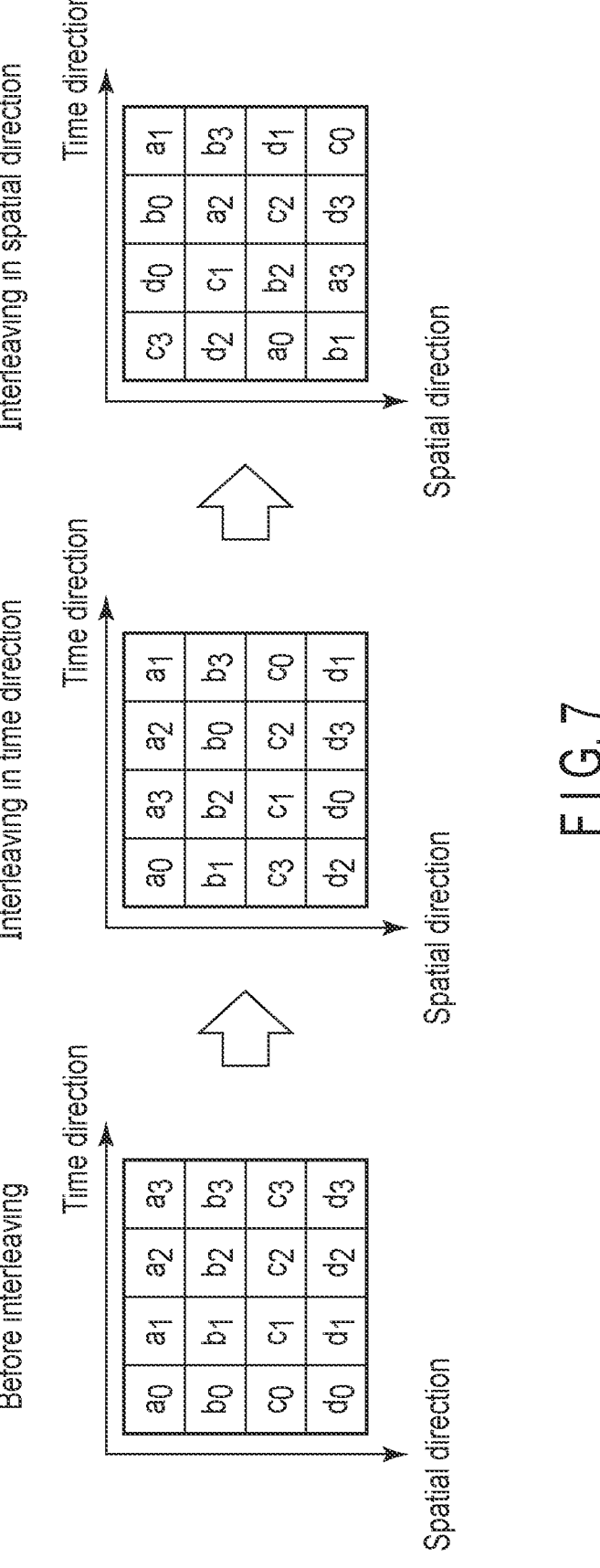
F I G. 7

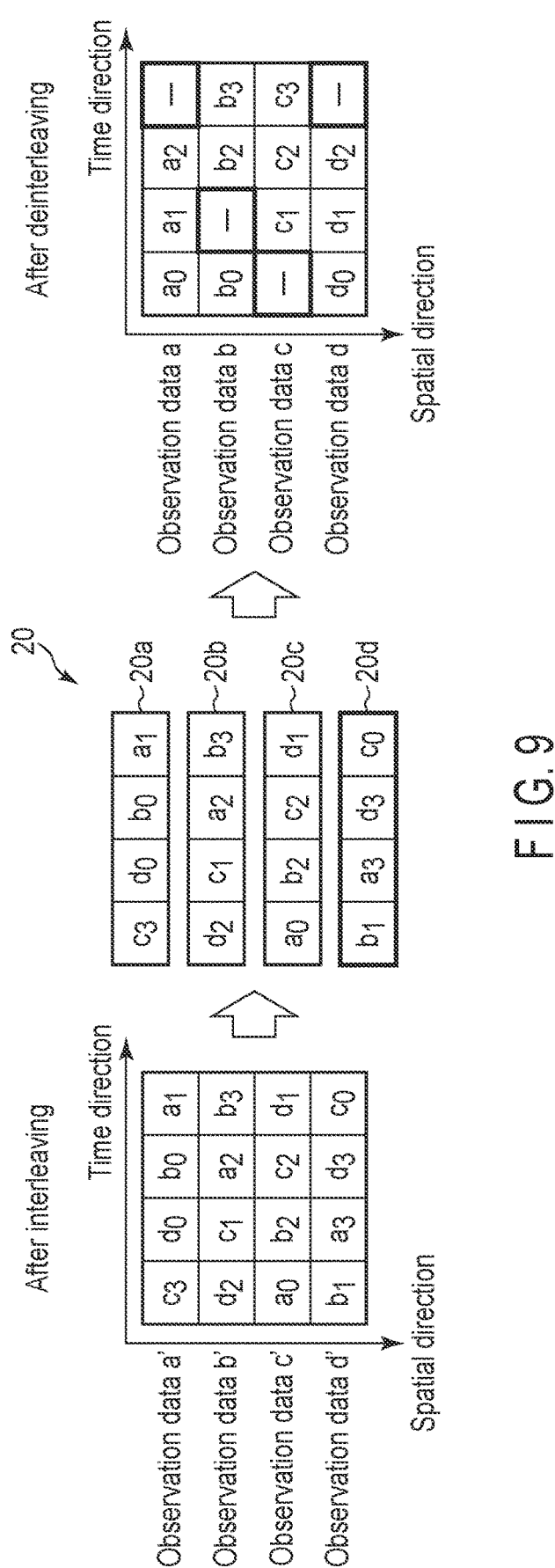
F I G. 9

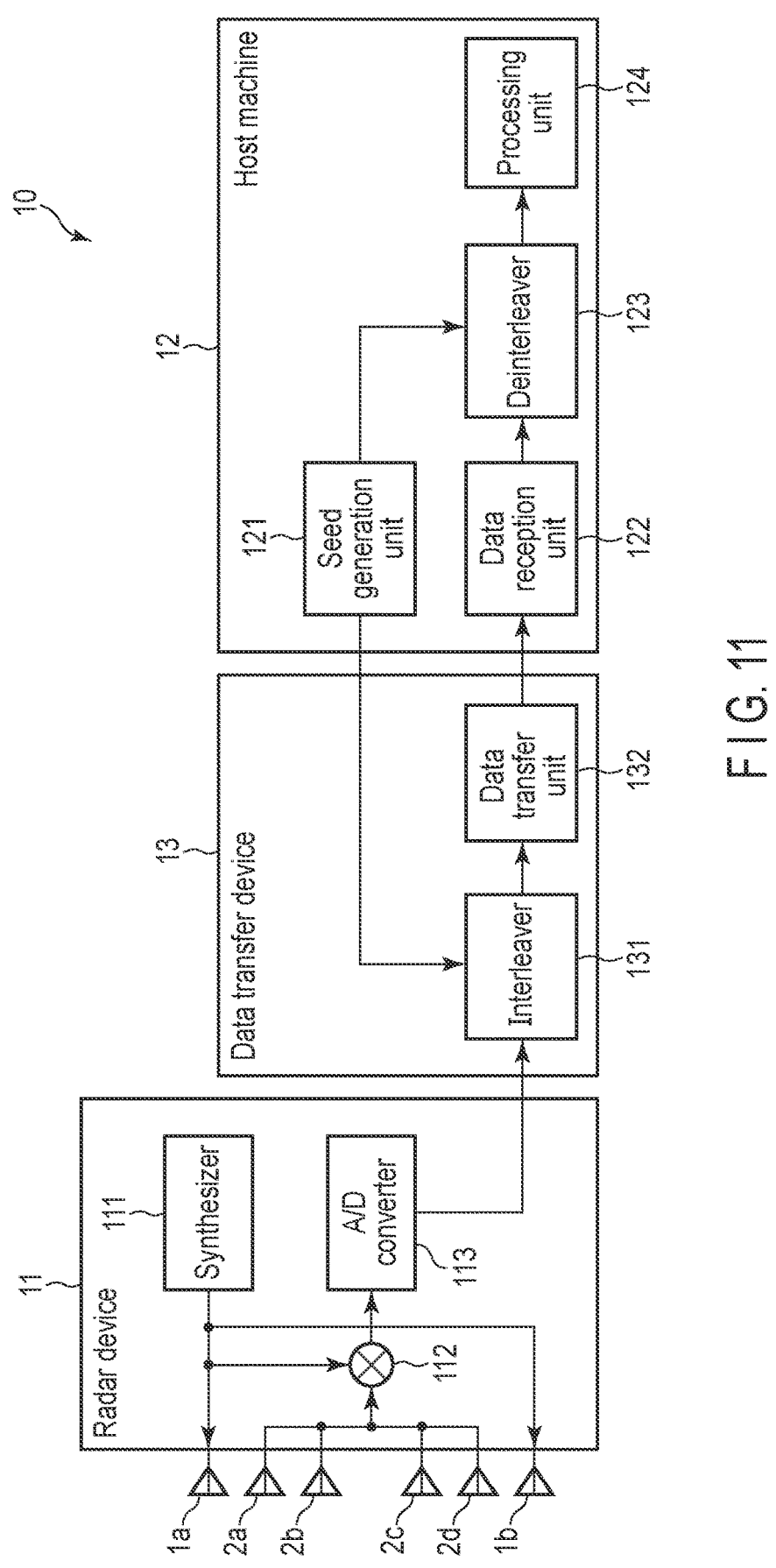
F I G. 11

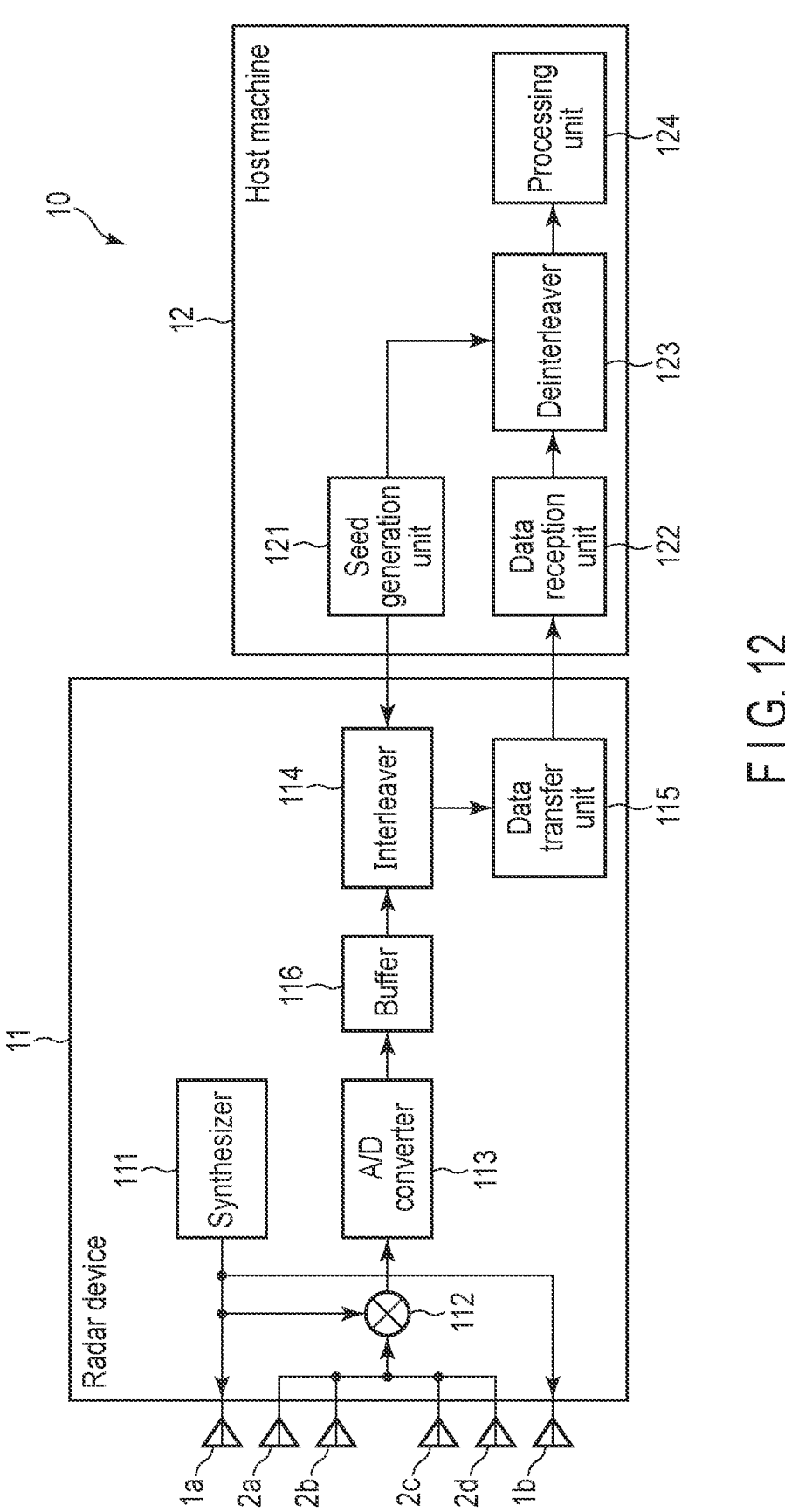
F I G. 12

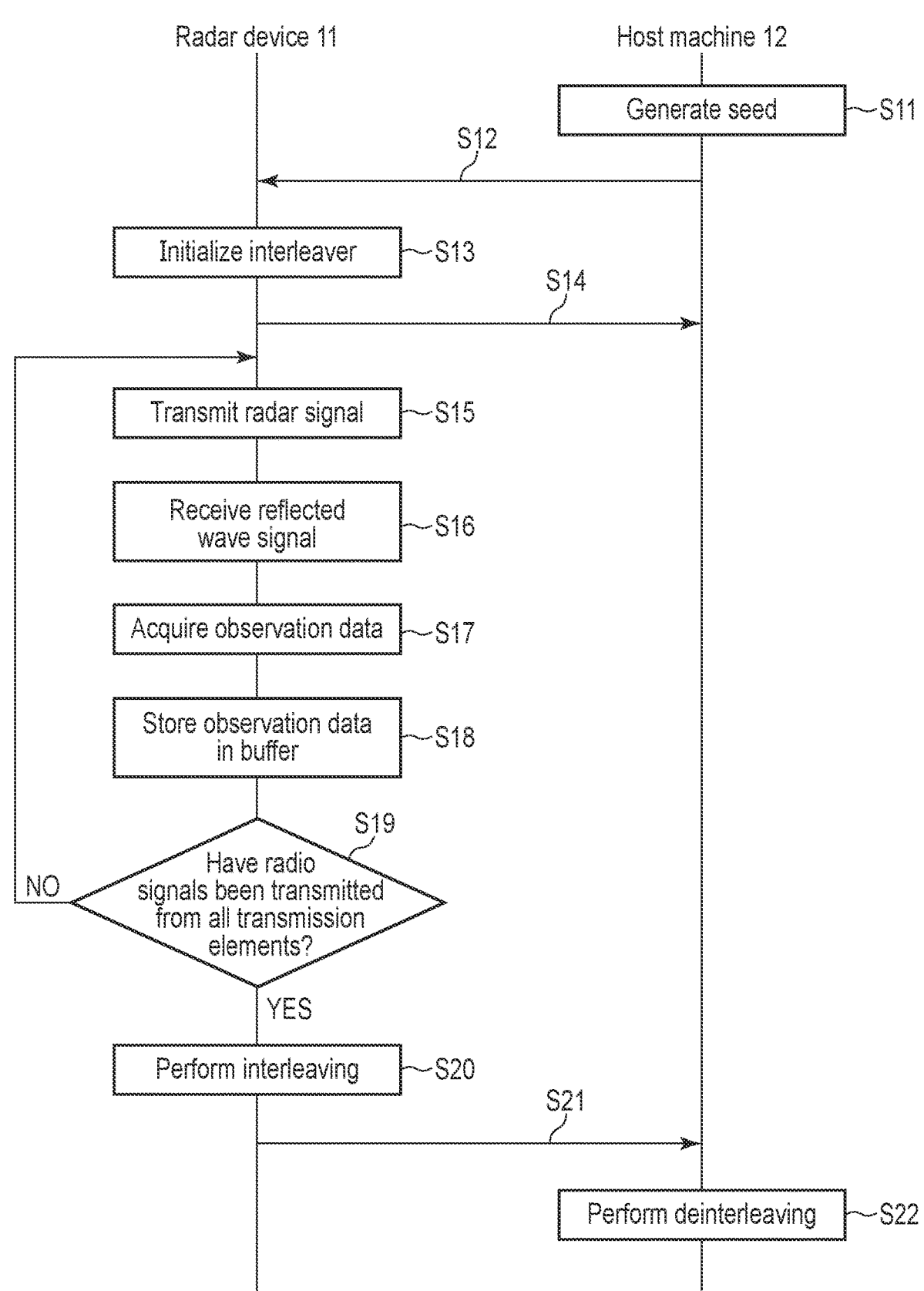
Radar device 11                                    Host machine 12
Generate seed ~S11
S12
Initialize interleaver ~S13
S14
Transmit radar signal ~S15
Receive reflected wave signal ~S16
Acquire observation data ~S17
Store observation data in buffer ~S18
S19
Have radio signals been transmitted from all transmission elements?
NO
YES
Perform interleaving ~S20
S21
Perform deinterleaving ~S22
F I G. 13

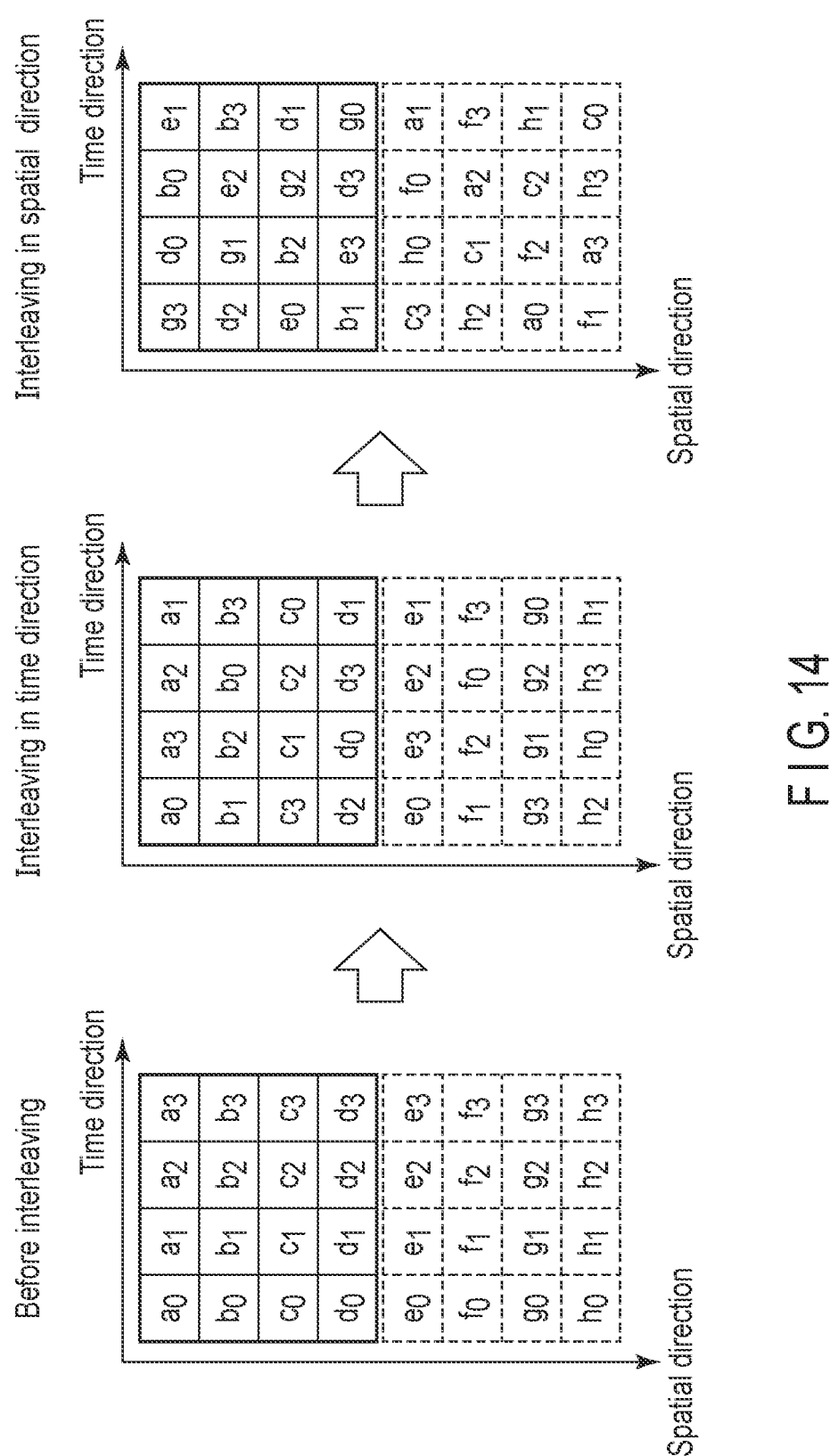
F I G. 14

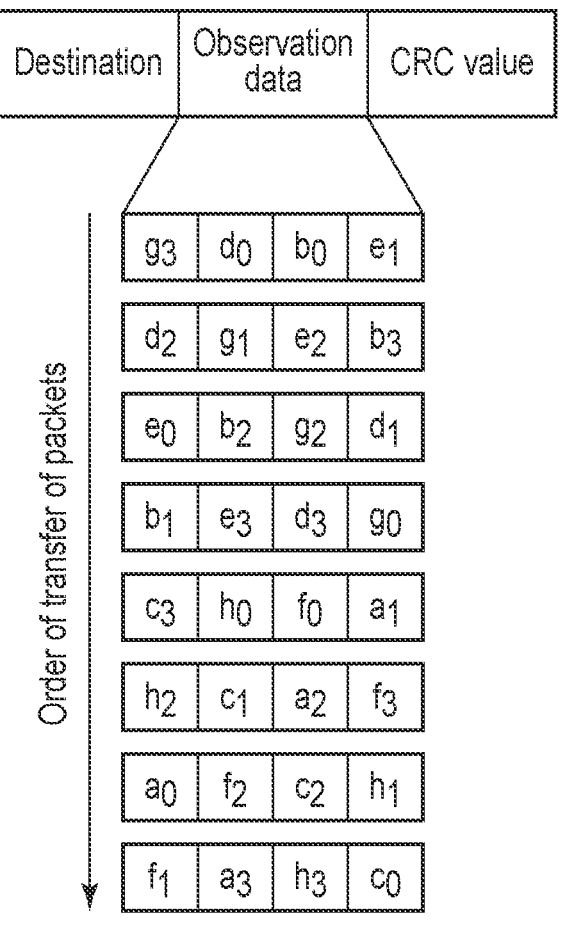
F I G. 15

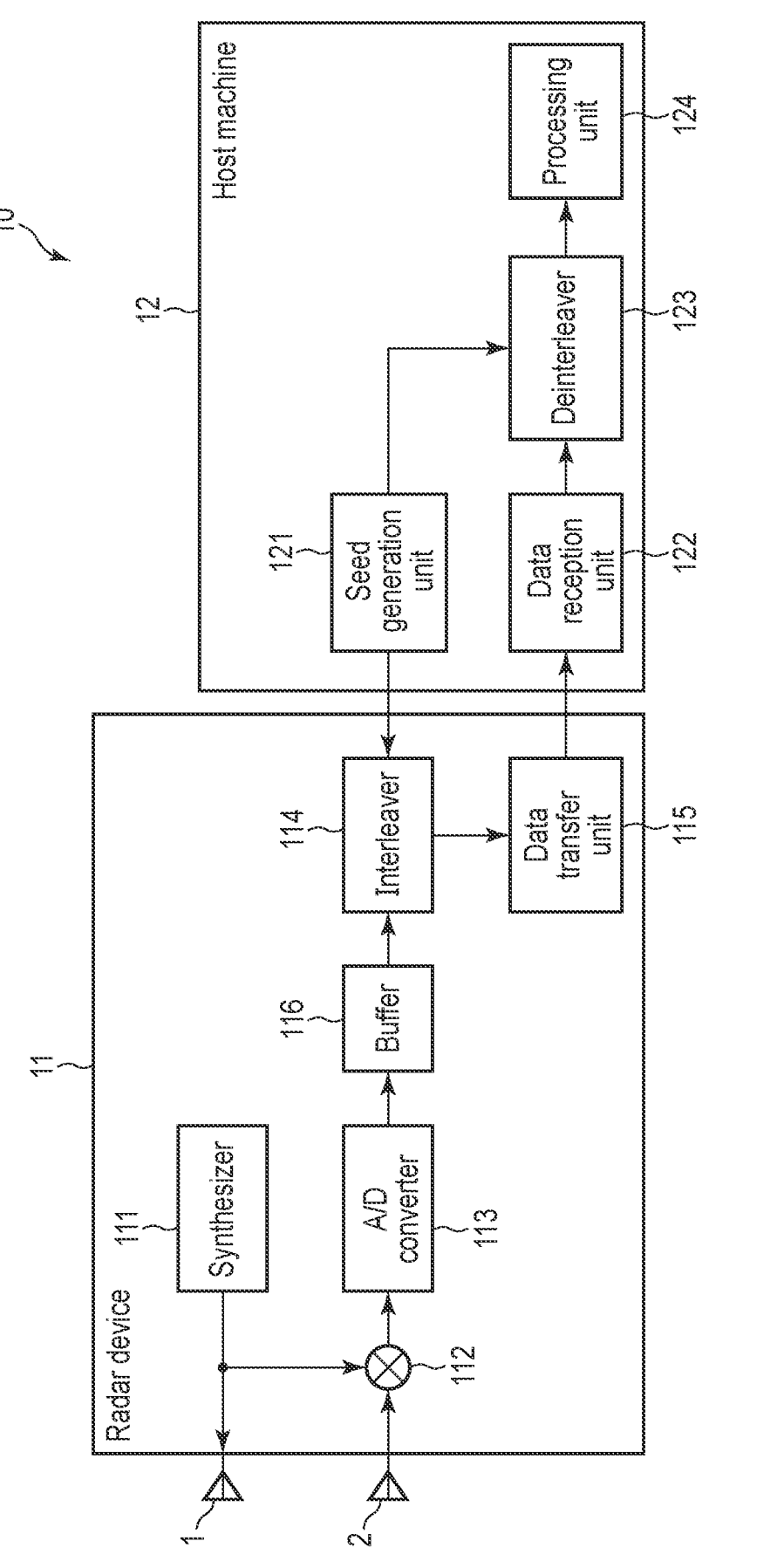
F I G. 16

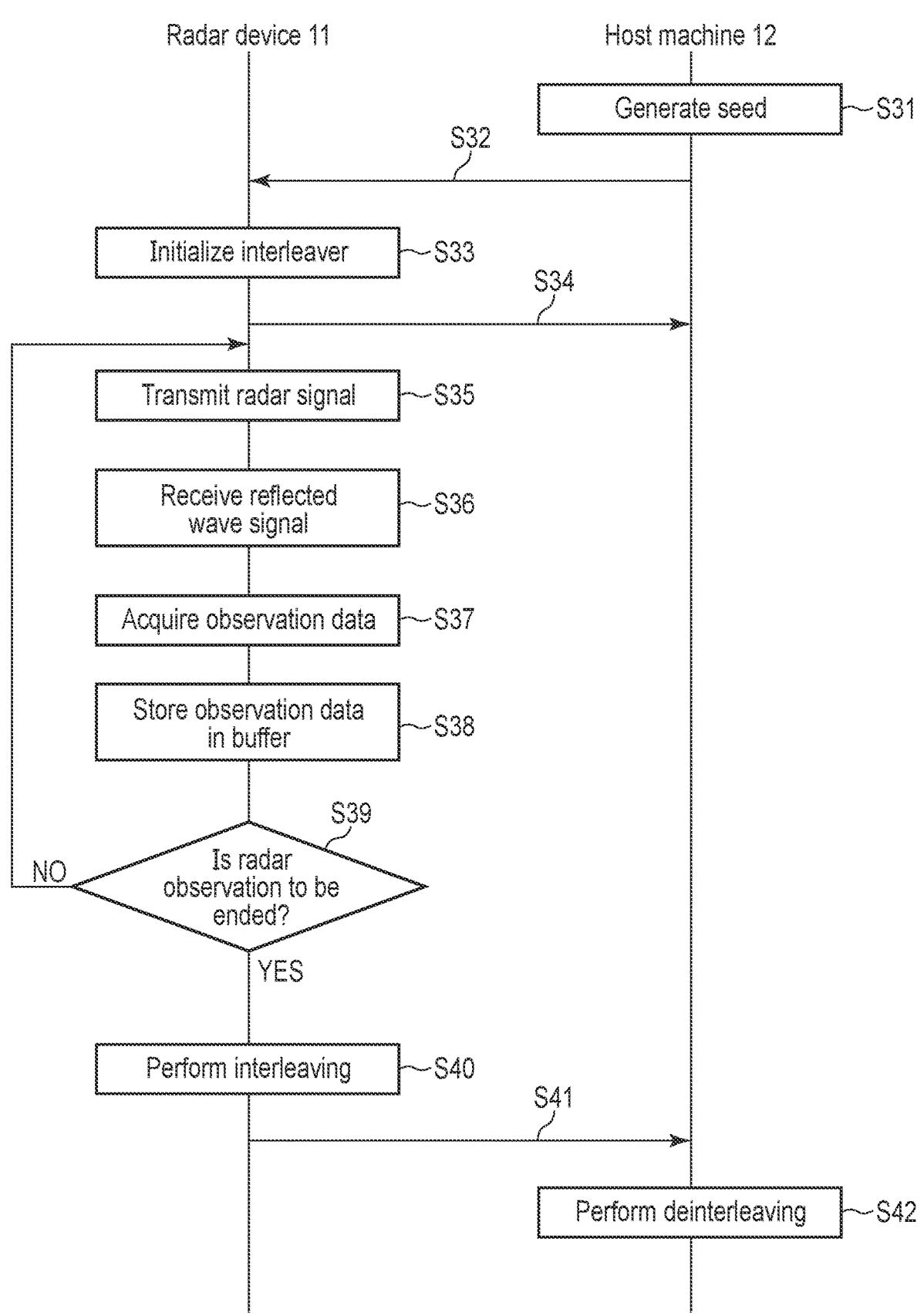
F I G. 17

RADAR SYSTEM, DATA TRANSFER DEVICE, AND METHOD

CROSS-REFERENCE TO RELATED APPLICATIONS

This application is based upon and claims the benefit of priority from Japanese Patent Application No. 2022-118787, filed Jul. 26, 2022, the entire contents of which are incorporated herein by reference.

FIELD

Embodiments described herein relate generally to a radar system, a data transfer device, and a method.

BACKGROUND

In recent years, a radar system that acquires information regarding an object in a manner in which a transmitter antenna emits (transmits) a radio wave and a receiver antenna observes (receives) an echo (hereinafter, referred to as radar echo) returned from the object has been developed.

Incidentally, in a case of a radar system including a radar device including the above-described transmitter antenna and receiver antenna and a host machine (processing device) that processes information acquired regarding an object, it is necessary to transfer observation data (that is, data observed in the radar device) based on a radar echo received in the receiver antenna from the radar device to the host machine.

However, as described above, in a case where an error of the observation data (hereinafter, referred to as data error) occurs when the observation data is transferred from the radar device to the host machine, the observation data is lost (missing), which adversely affects the processing of information in the radar system.

Therefore, there is a demand for a mechanism for suppressing an influence of a data error when the data error occurs in a radar system.

BRIEF DESCRIPTION OF THE DRAWINGS

FIG. 1 is a diagram for explaining an outline of a frequency modulated continuous wave (FMCW) system adopted in a radar device.

FIG. 2 is a diagram for explaining an outline of a multi-input multi-output (MIMO) radar.

FIG. 5 is a diagram illustrating an example of a configuration of a radar system according to the first embodiment.

FIG. 7 is a diagram for specifically explaining a plurality of pieces of ADC data to be interleaved.

FIG. 9 is a diagram for explaining an influence of a data error in the first embodiment.

FIG. 11 is a diagram illustrating an example of a configuration of a radar system according to a modification of the first embodiment.

FIG. 12 is a diagram illustrating an example of a configuration of a radar system according to a second embodiment.

FIG. 13 is a sequence chart illustrating an example of a processing procedure of the radar system according to the second embodiment.

FIG. 14 is a diagram for specifically explaining a plurality of pieces of ADC data to be interleaved.

FIG. 15 is a diagram for explaining a packet transferred from the radar device to a host machine.

FIG. 16 is a diagram illustrating an example of a configuration of a radar system according to a third embodiment.

FIG. 17 is a sequence chart illustrating an example of a processing procedure of the radar system according to the third embodiment.

DETAILED DESCRIPTION

Figure 3:
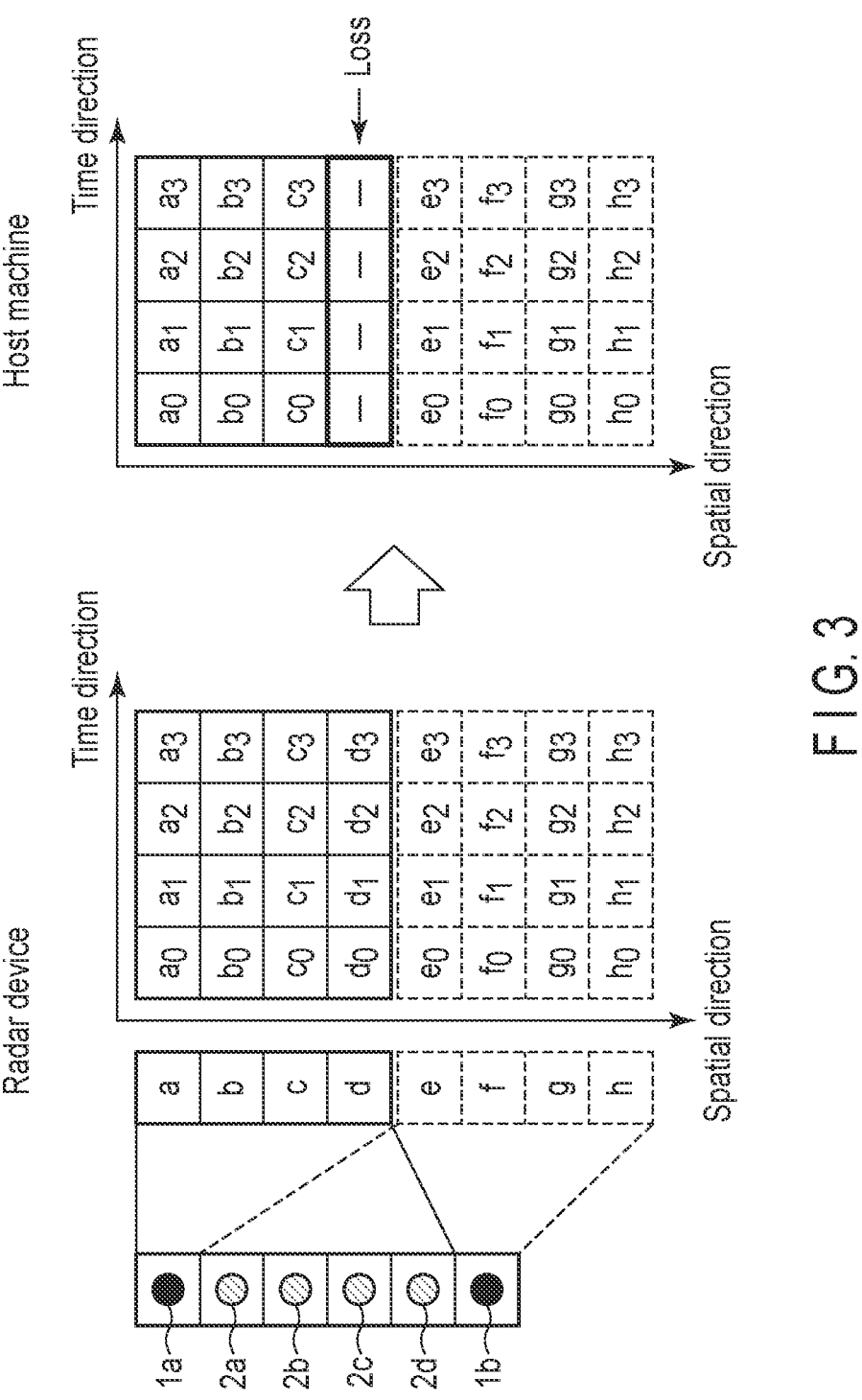
FIG. 3 is a diagram for explaining operation of a radar system according to a comparative example of a first embodiment.

In general, according to one embodiment, a radar system includes a radar device and a processing device that is communicably connected to the radar device. The radar device includes a transmitter antenna configured to transmit a radar signal, a receiver antenna configured to receive a radar echo based on a reflected wave of the transmitted radar signal, an acquisition unit configured to acquire a plurality of pieces of first observation data including a plurality of pieces of partial data having continuity based on the received radar echo, a first conversion unit configured to convert the pieces of first observation data into a plurality of pieces of second observation data including the pieces of partial data having discontinuity, and a transfer unit configured to transfer the pieces of second observation data to the processing device. The processing device includes a second conversion unit configured to convert the pieces of second observation data into the pieces of first observation data, and a processing unit configured to execute arithmetic processing using the pieces of first observation data converted from the pieces of second observation data.

Various embodiments will be described with reference to the accompanying drawings.

First Embodiment

First, a first embodiment will be described. A radar system according to the present embodiment is configured to measure a distance to an object (target) in a manner in which a receiver antenna receives a radar echo based on a reflected wave of a radar signal transmitted (emitted) from a transmitter antenna. Note that the radar signal transmitted from the transmitter antenna in such a radar system is, for example, a radio wave such as a millimeter wave (extra high frequency (EHF)). In the present embodiment, it is mainly described that the radar system measures the information, such distance to the object, angle, and radio velocity, and the like of the objects.

Hereinafter, an outline of the radar system will be briefly described. First, a frequency modulated continuous wave (FMCW) method will be described as an example of a radar modulation method for performing frequency modulation.

According to the FMCW method, as illustrated in FIG. 1, a radar signal (transmitted wave) modulated in such a way that a frequency changes with the lapse of time is transmitted, and a distance to an object is measured from a frequency difference (hereinafter, referred to as a beat frequency) between the transmitted and received echo signal.

Specifically, in the FMCW method, an intermediate frequency (IF) signal (hereinafter, referred to as an IF signal) is acquired by mixing the radar signal transmitted from the transmitter antenna and the radar echo received by the receiver antenna. The IF signal corresponds to a time waveform (sine wave) of the beat frequency described above. $f_b$, $\gamma$, and $\tau$ have a relationship of $f_b = \gamma \tau$, in which $f_b$ represents the beat frequency, $\gamma$ is an inclination (frequency change rate) (Hz/s) of the radar signal called a chirp rate, and $\tau$ represents a delay time of the radar echo with respect to the radar signal.

When, for example, fast Fourier transform (FFT) is applied to the IF signal, the IF signal is converted into frequency domain representation. In the FFT result, a peak appears at a position of the beat frequency $f_b$, and a distance (that is, the distance to the object reflecting the radar signal) corresponding to a position of the peak can be obtained.

The FMCW method that linearly performs frequency modulation as illustrated in FIG. 1 is particularly referred to as a liner-FMCW method.

Here, the radar system includes a radar device including the transmitter antenna and the receiver antenna, and a multi-input multi-output (MIMO) radar can be used as the radar device. The MIMO radar includes a plurality of transmitter antennas (transmitter antenna array) and a plurality of receiver antennas (receiver antenna array), and each of the transmitter antennas emits a radar signal in a time division manner, and a radar echo based on a reflected wave of the radar signal is received by the plurality of receiver antennas, so that it is possible to implement a large number of times of reception of the radar echo (that is, radar observation) with a small number of times of transmission of the radar signal (that is, the number of times of radar emission).

Specifically, as illustrated in FIG. 2, it is assumed that the MIMO radar includes, for example, two transmitter antennas $1a$ and $1b$ and four receiver antennas $2a$ to $2d$ linearly arranged in a predetermined spatial direction. In the following description, the spatial direction refers to an arrangement direction of the transmitter antennas $1a$ and $1b$ and the receiver antennas $2a$ to $2d$ (or a direction determined by the arrangement direction).

In this case, for example, assuming that a radar signal is transmitted from the transmitter antenna $1a$, a radar echo based on a reflected wave of the radar signal is received by the receiver antenna $2a$. Although the receiver antenna $2a$ has been described here, the radar echo based on the reflected wave of the radar signal transmitted from the transmitter antenna $1a$ is similarly received by the receiver antennas $2b$ to $2d$.

Although not illustrated in FIG. 2, for example, assuming that a radar signal is transmitted from the transmitter antenna $1b$, a radar echo based on a reflected wave of the radar signal is received by the receiver antenna $2a$. Although the receiver antenna $2a$ has been described here, the radar echo based on the reflected wave of the radar signal transmitted from the transmitter antenna $1b$ is similarly received by the receiver antennas $2b$ to $2d$.

That is, in the MIMO radar described above, radar observation is performed in each of the receiver antennas $2a$ to $2d$ when a radar signal is transmitted from the transmitter antenna $1a$, and radar observation is similarly performed in the receiver antennas $2a$ to $2d$ when a radar signal is transmitted from the transmitter antenna $1b$.

With this configuration, the MIMO radar including the two transmitter antennas $1a$ and $1b$ and the four receiver antennas $2a$ to $2d$ as illustrated in FIG. 2 can implement eight observation points $3a$ to $3h$ arranged in the spatial direction only by emitting the radar signal from each of the transmitter antennas $1a$ and $1b$ once. For example, the observation point $3a$ is an observation point implemented by the receiver antenna $2a$ receiving a radar echo based on a reflected wave of the radar signal transmitted from the transmitter antenna $1a$. Similarly, the observation points $3b$ to $3d$ are observation points implemented by the receiver antennas $2b$ to $2d$ receiving radar echoes based on reflected waves of the radar signals transmitted from the transmitter antenna $1a$. Furthermore, the observation point $3e$ is an observation point implemented by the receiver antenna $2a$ receiving a radar echo based on a reflected wave of the radar signal transmitted from the transmitter antenna $1b$. Similarly, the observation points $3f$ to $3h$ are observation points implemented by the receiver antennas $2b$ to $2d$ receiving radar echoes based on reflected waves of the radar signals transmitted from the transmitter antenna $1b$. That is, in the MIMO radar, one observation point is implemented by a combination of one transmitter antenna and one receiver antenna.

With such a MIMO radar, it is possible to measure a distance to an object by using an IF signal (an IF signal acquired based on radar signals transmitted from the transmitter antennas $1a$ and $1b$ in a time division manner and a radar echo received by each of the receiver antennas $2a$ to $2d$) observed at each of the observation points $3a$ to $3h$.

In FIG. 2, the same waveform is illustrated as the IF signal observed at each of the observation points $3a$ to $3h$ for convenience, but a frequency of the IF signal varies depending on the distance to the object.

Furthermore, in a case of using the MIMO radar, a time difference occurs in each reflected signal, and thus, for example, an azimuth of the object can be measured with a high spatial resolution by calculating a correlation between the reflected signals by signal processing.

Here, operation of a radar system according to a comparative example of the present embodiment will be described with reference to FIG. 3.

Note that the radar system according to the comparative example of the present embodiment has a configuration in which a radar device and a host machine are communicably connected. The radar device is assumed to be a MIMO radar that includes two transmitter antennas $1a$ and $1b$ and four receiver antennas $2a$ to $2d$ as described above to adopt the FMCW method for implementing eight observation points $3a$ to $3h$ illustrated in FIG. 2. In addition, the host machine is assumed to be, for example, a processing device having a function of executing processing for measuring a distance to an object.

First, assuming that a radar echo based on a reflected wave of a radar signal transmitted by the transmitter antenna $1a$ is received by the receiver antenna $2a$, an IF signal (that is, an IF signal observed at the observation point $3a$) is acquired by mixing the transmitted radar signal and the radar echo.

In the comparative example of the present embodiment, such an IF signal (analog signal) observed at the observation point $3a$ is A/D-converted into observation data a (digital signal).

In the A/D conversion, an amplitude value (hereinafter, referred to as a sampling value) of the analog signal sampled at a discrete period is encoded, and the observation data a includes an encoding result (hereinafter, referred to as ADC data) of each of a plurality of sampling values for the IF signal. Here, the observation data a includes pieces of ADC data $a_0$ to $a_3$. In this case, the observation data a can be said to be data in which the pieces of ADC data $a_0$ to $a_3$ are arranged in a time direction.

Here, a case where the IF signal observed at the observation point $3a$ is A/D-converted into the observation data a has been described, but IF signals observed at the other observation points $3b$ to $3h$ are also A/D-converted into pieces of observation data b to h in a similar manner.

In this case, the observation data b includes ADC data $b_0$ to $b_3$, the observation data c includes a plurality of pieces of ADC data $c_0$ to $c_3$, the observation data d includes a plurality of pieces of ADC data $d_0$ to $d_3$, the observation data e includes a plurality of pieces of ADC data $e_0$ to $e_3$, the observation data f includes a plurality of pieces of ADC data $f_0$ to $f_3$, the observation data g includes a plurality of pieces of ADC data $g_0$ to $g_3$, and the observation data h includes a plurality of pieces of ADC data $h_0$ to $h_3$.

Next, radar data including the pieces of observation data a to h described above is transferred from the radar device to the host machine. Note that the transfer of the radar data is performed, for example, in units of transmitter antennas. Specifically, for example, radar data including the pieces of observation data a to d obtained by A/D converting the IF signals observed at the observation points $3a$ to $3d$ implemented by a combination of the transmitter antenna $1a$ and the receiver antennas $2a$ to $2d$ is transferred from the radar device to the host machine, and radar data including the pieces of observation data e to h obtained by A/D converting the IF signals observed at the observation points $3e$ to $3h$ implemented by a combination of the transmitter antenna $1b$ and the receiver antennas $2a$ to $2d$ is transferred from the radar device to the host machine. In this case, the radar data including the pieces of observation data a to d can be said to be data in which the pieces of observation data a to d are arranged in a spatial direction similar to that of the observation points $3a$ to $3d$. Similarly, the radar data including the pieces of observation data e to h can be said to be data in which the pieces of observation data e to h are arranged in a spatial direction similar to that of the observation points $3e$ to $3h$.

The above-described radar data is divided into, for example, communication packets and transferred from the radar device to the host machine. Specifically, the radar data including the pieces of observation data a to d is divided into, for example, a packet including the observation data a, a packet including the observation data b, a packet including the observation data c, and a packet including the observation data d, and the packets are sequentially transferred (transmitted). Furthermore, the radar data including the pieces of observation data e to h is divided into, for example, a packet including the observation data e, a packet including the observation data f, a packet including the observation data g, and a packet including the observation data h, and the packets are sequentially transferred (transmitted). That is, here, it is assumed that four pieces of ADC data included in each of the pieces of observation data a to h are transferred in one packet.

The host machine executes processing for measuring a distance to an object based on the radar data (that is, the pieces of observation data a to h representing the IF signals observed at the respective observation points $3a$ to $3h$) transferred from the radar device.

In the radar system according to the comparative example of the present embodiment, it is possible to implement high-resolution measurement of a distance to an object (hereinafter, referred to as distance measurement) by the operation as described above.

Meanwhile, as described above, in a case where a data error (packet error) occurs in a process of transferring the radar data from the radar device to the host machine, for example, some of the pieces of observation data a to h are lost, but such loss of the observation data adversely affects distance measurement in the radar system.

Figure 4:
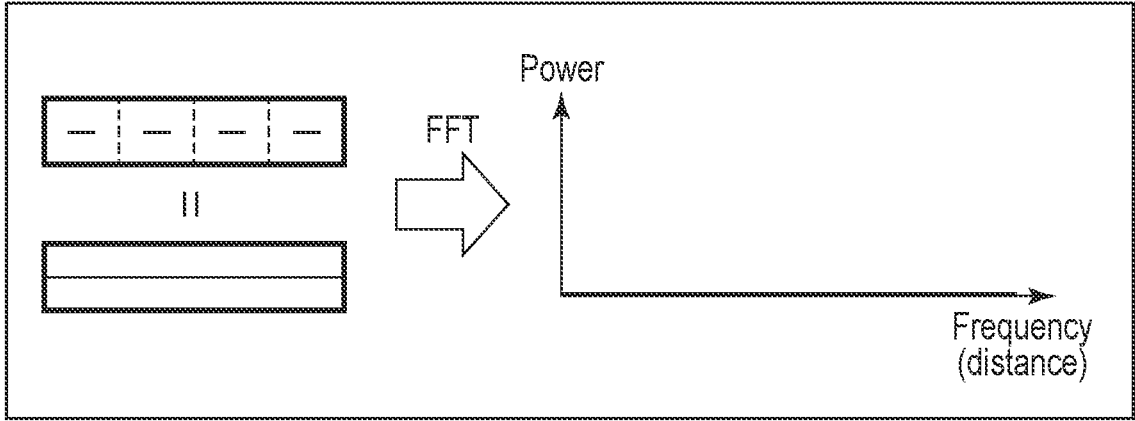
FIG. 4 is a diagram for explaining operation of the radar system according to the comparative example of the first embodiment.

Specifically, as illustrated in FIG. 3, for example, it is assumed that a data error (packet error) occurs in the packet including the observation data d (the plurality of pieces of ADC data $d_0$ to $d_3$). The observation data d is a digital signal representing the IF signal observed at the observation point $3d$. However, in a case where the observation data d (the pieces of ADC data $d_0$ to $d_3$) is lost due to the occurrence of the data error as described above, data included in the packet in which the observation data d is lost does not represent a time waveform of the beat frequency. Therefore, even in a case where the FFT is applied, a peak does not appear at the position of the beat frequency in the observation data d as illustrated in FIG. 4. That is, the host machine cannot use the observation data d for distance measurement.

As described above, considering that high resolution of azimuth estimation for a target is implemented by using all the pieces of observation data (the pieces of observation data a to h) as one of the signal processings using the MIMO radar, even in a case where the azimuth estimation processing is executed in a state where the observation data d is lost, for example, the high resolution cannot be implemented, and the accuracy of the azimuth estimation deteriorates.

In this case, it is conceivable that the host machine requests the radar device to retransmit (retransfer) (the packet including) the observation data d, but the retransmission of the observation data d from the radar device to the host machine causes an increase in processing latency in the radar system.

That is, the radar system according to the comparative example of the present embodiment is affected by the data error occurring in the transfer of the radar data described above, for example, the accuracy of information regarding an object (for example, a distance, an azimuth, a speed, and the like) deteriorates or the processing latency increases.

Therefore, the radar system according to the present embodiment has a configuration for suppressing the influence of the data error (packet error) occurring in the transfer of the radar data.

Hereinafter, the radar system according to the present embodiment will be described.

FIG. 5 illustrates an example of the configuration of the radar system according to the present embodiment. As illustrated in FIG. 5, a radar system 10 includes a radar device 11 and a host machine (processing device) 12 communicably connected to the radar device 11.

Some or all of the functions of the radar device 11 and the host machine 12 described below may be implemented by hardware, software (a processor such as a central processing unit (CPU) or a microcontroller executes a predetermined program), or a combination of hardware and software.

The radar device 11 is a MIMO radar adopting the FMCW method described above, and includes, for example, two transmitter antennas $1a$ and $1b$ and four receiver antennas $2a$ to $2d$. In the present embodiment, an example in which the number of transmitter antennas is two and the number of receiver antennas is four will be described for the sake of convenience, but each of the number of transmitter antennas and the number of receiver antennas may be two or more.

The radar device 11 further includes a synthesizer 111, a mixer 112, an A/D converter 113, an interleaver 114, and a data transfer unit 115.

The synthesizer 111 generates a radar signal corresponding to the FMCW method (a transmitted wave modulated in such a way that the frequency changes with the lapse of time). The radar signal generated by the synthesizer 111 is output to the transmitter antennas 1*a* and 1*b* and the mixer 112.

The transmitter antennas 1*a* and 1*b* transmit (emit) the radar signal output from the synthesizer 111 in a time-division manner. Further, the receiver antennas 2*a* to 2*d* receive radar echo based on reflected waves of radar signals transmitted from the transmitter antennas 1*a* and 1*b*. The radar echo received by the receiver antennas 2*a* to 2*d* are output to the mixer 112.

The mixer 112 mixes the radar signal output from the synthesizer 111 and the radar echo output from the receiver antennas 2*a* to 2*d*. The above-described IF signal is generated (acquired) by the mixing performed by the mixer 112.

As described above, in a case where the radar device 11 includes the transmitter antennas 1*a* and 1*b* and the receiver antennas 2*a* to 2*d*, an IF signal is generated for each of the above-described observation points 3*a* to 3*h* (that is, a combination of the transmitter antennas 1*a* and 1*b* and the receiver antennas 2*a* to 2*d*). In other words, the IF signal generated by the mixer 112 corresponds to the IF signal observed at each of the observation points 3*a* to 3*h*. The IF signal generated by the mixer 112 is output to the A/D converter 113.

The A/D converter 113 generates (acquires) a plurality of pieces of observation data (hereinafter, referred to as first observation data) by converting the IF signal output from the mixer 112 from analog to digital (that is, A/D conversion is performed on the IF signal).

The plurality of pieces of first observation data generated by the A/D converter 113 include a plurality of pieces of ADC data (encoding results of a plurality of sampling values) arranged in the time direction, and correspond to the pieces of observation data a to h described above with reference to FIG. 3. That is, each of the plurality of pieces of first observation data can be said to be, for example, data including a plurality of pieces of ADC data having temporal continuity (that is, the pieces of ADC data are arranged in chronological order). The plurality of pieces of first observation data generated by the A/D converter 113 are output to the interleaver 114.

Here, in the present embodiment, it is necessary to transfer radar data including the plurality of pieces of first observation data from the radar device 11 to the host machine 12. However, as described above with reference to FIG. 3, for example, in a case where a data error occurs in a packet including the observation data d (the plurality of pieces of ADC data $d_0$ to $d_3$), since all of the plurality of pieces of ADC data $d_0$ to $d_3$ are lost, the host machine 12 cannot use the observation data d for distance measurement.

Therefore, the interleaver 114 converts the plurality of pieces of first observation data into a plurality of pieces of observation data (hereinafter, referred to as second observation data) including a plurality of pieces of ADC data having discontinuity in order to avoid simultaneous loss of all the pieces of ADC data included in one piece of observation data. The plurality of pieces of ADC data having discontinuity in the present embodiment include a case where a plurality of pieces of ADC data having temporal or spatial continuity in the plurality of pieces of first observation data are not arranged adjacent to each other. In this case, the interleaver 114 executes processing of rearranging (that is, interleaving the plurality of pieces of ADC data) the plurality of pieces of ADC data included in the plurality of pieces of first observation data. The plurality of pieces of second observation data converted from the plurality of pieces of first observation data by the interleaver 114 are output to the data transfer unit 115.

The data transfer unit 115 transfers radar data including the plurality of pieces of second observation data output from the interleaver 114 to the host machine 12. As described above, assuming that the plurality of pieces of first observation data are the pieces of observation data a to h and the radar data is transferred in units of transmitter antennas, the interleaver 114 converts the pieces of observation data a to d (the plurality of pieces of first observation data) into, for example, pieces of observation data a' to d' (the plurality of pieces of second observation data), and the data transfer unit 115 transfers radar data including the observation data a' to d' to the host machine 12. In addition, the interleaver 114 converts the pieces of observation data e to h (the plurality of pieces of first observation data) into, for example, pieces of observation data e' to h' (the plurality of pieces of second observation data), and the data transfer unit 115 transfers radar data including the pieces of observation data e' to h' to the host machine 12.

The radar device 11 and the host machine 12 may be connected by wire or wirelessly. Furthermore, the transfer of the radar data is performed according to a communication scheme adopted between the radar device 11 and the host machine 12.

As illustrated in FIG. 5, the host machine 12 includes a seed generation unit 121, a data reception unit 122, a deinterleaver 123, and a processing unit 124.

The seed generation unit 121 generates a seed for interleaving (that is, rearranging) the plurality of pieces of ADC data as described above. The seed generated by the seed generation unit 121 in this manner is shared by the radar device 11 and the host machine 12. Specifically, the seed generated by the seed generation unit 121 is passed to the interleaver 114 included in the radar device 11 and the deinterleaver 123 included in the host machine 12, and is held in the interleaver 114 and the deinterleaver 123.

The data reception unit 122 receives the radar data (the plurality of pieces of second observation data) transferred from the radar device 11 (the data transfer unit 115).

The deinterleaver 123 converts the plurality of pieces of second observation data included in the radar data received by the data reception unit 122 into the plurality of pieces of first observation data. In this case, the deinterleaver 123 executes processing of reverting the plurality of pieces of ADC data (that is, deinterleaving the plurality of pieces of ADC data) included in the plurality of pieces of second observation data to the original arrangement before interleaving described above.

It is assumed that the interleaver 114 executes processing of converting the plurality of pieces of first observation data into the plurality of pieces of second observation data based on the seed held in the interleaver 114 (that is, the seed shared by the radar device 11 and the host machine 12). In this case, similarly to the interleaver 114, the deinterleaver 123 can convert the plurality of pieces of second observation data into the plurality of pieces of first observation data based on the seed held in the deinterleaver 123.

The processing unit 124 executes arithmetic processing using the plurality of pieces of first observation data converted from the plurality of pieces of second observation data by the deinterleaver 123.

The arithmetic processing executed by the processing unit 124 includes the above-described processing for measuring a distance to an object existing in a range to which the radar signal is emitted. Further, the arithmetic processing executed by the processing unit 124 may include processing using the distance to the object. Furthermore, in the present embodiment, measuring a distance to an object has been mainly described, but the arithmetic processing executed by the processing unit 124 may be processing for measuring an azimuth or speed of an object.

Specifically, for example, in a case where the radar system 10 according to the present embodiment is used to inspect an object (a dangerous article or the like hidden under clothing) possessed by a person passing through a predetermined region, the processing unit 124 may execute processing of determining the degree of risk related to a possibility that a target person possesses a dangerous article based on, for example, a difference in distribution shape between amplitudes of IF signals (that is, reflection intensities of radar signals) represented by the plurality of pieces of first observation data.

Next, an example of a processing procedure of the radar system 10 according to the present embodiment will be described with reference to a sequence chart of FIG. 6.

First, the seed generation unit 121 included in the host machine 12 generates a seed to be used in the radar device 11 (the interleaver 114) (step S1).

Once the processing of step S1 is executed, the seed generation unit 121 (the host machine 12) transmits the seed generated in step S1 to the radar device 11 (step S2).

The processing of step S2 corresponds to processing of notifying the radar device 11 (the interleaver 114) of interleaving based on the seed generated in step S1, and in a case where the seed is received by the radar device 11, the interleaver 114 is initialized (step S3). In step S3, for example, the past seed held in the interleaver 114 is discarded, and processing of replacing the past seed with the seed transmitted in step S2 (that is, a new seed) is executed. As a result, the new seed (the seed generated by the seed generation unit 121) is held in the interleaver 114.

Once the processing of step S3 is executed, the radar device 11 transmits an acknowledgement response (Ack) indicating that the initialization of the interleaver 114 is completed to the host machine 12 (step S4).

The seed generated in step S1 is also held in the deinterleaver 123 provided in the host machine 12.

Here, in the present embodiment, the transmitter antennas 1a and 1b transmit the radar signals in a time division manner, but here, it is assumed that the transmitter antenna 1a transmits the radar signal before the transmitter antenna 1b. In this case, once the processing of step S4 is executed, a radar signal is generated by the synthesizer 111, and the radar signal is transmitted (emitted) from the transmitter antenna 1a (step S5).

Once the radar signal is transmitted from the transmitter antenna 1a in step S5, each of the receiver antennas 2a to 2d receives a radar echo based on a reflected wave of the radar signal (step S6).

Next, the first observation data is acquired based on the radar echo received in step S6 (step S7).

Specifically, in step S7, the mixer 112 generates an IF signal by mixing the radar signal transmitted in step S5 with, for example, the radar echo received by the receiver antenna 2a. This IF signal corresponds to an IF signal observed at an observation point implemented by a combination of (the radar signal transmitted from) the transmitter antenna 1a and (the radar echo received by) the receiver antenna 2a. In addition, the A/D converter 113 performs A/D conversion on the IF signal (analog signal) generated by the mixer 112 to generate the first observation data (digital signal) representing the IF signal.

Similarly, the mixer 112 generates an IF signal by mixing the radar signal transmitted in step S5 with, for example, the radar echo received by the receiver antenna 2b. This IF signal corresponds to an IF signal observed at an observation point implemented by a combination of the transmitter antenna 1a and the receiver antenna 2b. In addition, the A/D converter 113 performs A/D conversion on the IF signal generated by the mixer 112 to generate the first observation data representing the IF signal.

In addition, the mixer 112 generates an IF signal by mixing the radar signal transmitted in step S5 with, for example, the radar echo received by the receiver antenna 2c. This IF signal corresponds to an IF signal observed at an observation point implemented by a combination of the transmitter antenna 1a and the receiver antenna 2c. In addition, the A/D converter 113 performs A/D conversion on the IF signal generated by the mixer 112 to generate the first observation data representing the IF signal.

In addition, the mixer 112 generates an IF signal by mixing the radar signal transmitted in step S5 with, for example, the radar echo received by the receiver antenna 2d. This IF signal corresponds to an IF signal observed at an observation point implemented by a combination of the transmitter antenna 1a and the receiver antenna 2d. In addition, the A/D converter 113 performs A/D conversion on the IF signal generated by the mixer 112 to generate the observation data representing the IF signal.

That is, in a case where the processing of step S7 is executed, the same number of pieces of first observation data as the number of receiver antennas 2a to 2d are generated, and the plurality of pieces of first observation data are output from the A/D converter 113 to the interleaver 114.

In a case where the radar device 11 includes one mixer 112 as illustrated in FIG. 5 described above, the mixer 112 operates in such a way as to sequentially mix the radar echoes received by the respective receiver antennas 2a to 2d. However, the radar device 11 may include, for example, the same number of mixers 112 as the receiver antennas 2a to 2d, and the mixers 112 corresponding to the receiver antennas may mix the radar echoes received by the respective receiver antennas 2a to 2d.

Next, the interleaver 114 interleaves the plurality of pieces of ADC data included in the plurality of pieces of first observation data output from the A/D converter 113 by executing the processing of step S7 (step S8). The processing of step S8 is executed based on the seed held in the interleaver 114 by executing the processing of step S3 as described above.

Hereinafter, the plurality of pieces of ADC data interleaved in step S8 will be specifically described with reference to FIG. 7. Here, a case where the plurality of pieces of first observation data are the observation data a to d described in FIG. 3, and the pieces of ADC data $a_0$ to $a_3$, $b_0$ to $b_3$, $c_0$ to $c_3$, and $d_0$ to $d_3$ included in the pieces of observation data a to d are interleaved (rearranged) will be described.

First, the interleaver 114 interleaves the plurality of pieces of ADC data arranged in the time direction in each of the pieces of observation data a to d. In the example illustrated in FIG. 7, for example, the pieces of ADC data $a_0$ to $a_3$ included in the observation data a are rearranged in the order of $a_0$, $a_3$, $a_2$, and $a_1$. Although interleaving for the pieces of ADC data $a_0$ to $a_3$ included in the observation data a has been described here, the same applies to the plurality of pieces of ADC data included in each of the pieces of observation data b to d. In the example illustrated in FIG. 7, the pieces of ADC data $b_0$ to $b_3$ included in the observation data b are rearranged in the order of $b_1$, $b_2$, $b_0$, and $b_3$. Furthermore, the pieces of ADC data $c_0$ to $c_3$ included in the observation data c are rearranged in the order of $c_3$, $c_1$, $c_2$, and $c_0$. Furthermore, the pieces of ADC data $d_0$ to $d_3$ included in the observation data d are rearranged in the order of $d_2$, $d_0$, $d_3$, and $d_1$.

Next, the interleaver 114 performs interleaving of the plurality of pieces of ADC data arranged in the spatial direction for the plurality of pieces of ADC data (arrangement) interleaved in the time direction as described above. In the example illustrated in FIG. 7, for example, the pieces of ADC data $a_0$, $b_1$, $c_3$, and $d_0$ are rearranged in the order of $c_3$, $d_2$, $a_0$, and $b_1$. Furthermore, the pieces of ADC data $a_3$, $b_2$, $c_1$, and $d_0$ are rearranged in the order of $d_0$, $c_1$, $b_2$, and $a_3$. Furthermore, the pieces of ADC data $a_2$, $b_0$, $c_2$, and $d_3$ are rearranged in the order of $b_0$, $a_2$, $c_2$, and $d_3$. Furthermore, the pieces of ADC data $a_1$, $b_3$, $c_0$, and $d_3$ are rearranged in the order of $a_1$, $b_3$, $d_1$, and $c_0$.

In step S8 described above, the plurality of pieces of ADC data may be randomly rearranged in the time direction and the spatial direction, but in FIG. 7, it is assumed that four pieces of ADC data (for example, the pieces of ADC data $c_3$, $d_0$, $b_0$, and $a_1$) arranged in the time direction are transferred in one packet, and the plurality of pieces of ADC data are interleaved in such a way that at least a plurality of pieces of ADC data (that is, the pieces of ADC data having continuity) included in the same first observation data are not included in one packet.

In a case where the processing of step S7 described above is executed, the plurality of pieces of first observation data including the plurality of pieces of ADC data having continuity are converted into the plurality of pieces of second observation data including the plurality of pieces of ADC data having discontinuity. In the example illustrated in FIG. 7, the observation data a including the pieces of ADC data $a_0$ to $a_3$, the observation data b including the pieces of ADC data $b_0$ to $b_3$, the observation data c including the pieces of ADC data $c_0$ to $c_3$, and the observation data d including the pieces of ADC data $d_0$ to $d_3$ (the plurality of pieces of first observation data) are converted into, for example, the observation data a' including the pieces of ADC data $c_3$, $d_0$, $b_0$, and $a_1$, the observation data b' including the pieces of ADC data $d_2$, $c_1$, $a_2$, and $b_3$, the observation data c' including the pieces of ADC data $a_0$, $b_2$, $c_2$, and $d_1$, and the observation data d' including the pieces of ADC data $b_1$, $a_3$, $d_3$, and $c_0$ (the plurality of pieces of second observation data).

Next, the data transfer unit 115 transfers, to the host machine 12, the radar data (that is, the series of rearranged data) including the plurality of pieces of second observation data converted from the plurality of pieces of first observation data by executing the processing of step S8 (step S9).

In step S9, the data transfer unit 115 generates a plurality of packets from the radar data (the plurality of pieces of second observation data) in accordance with the size of the packet based on the communication scheme (a radar data transfer scheme) between the radar device 11 and the host machine 12, and sequentially transfers the plurality of packets.

Figure 8:
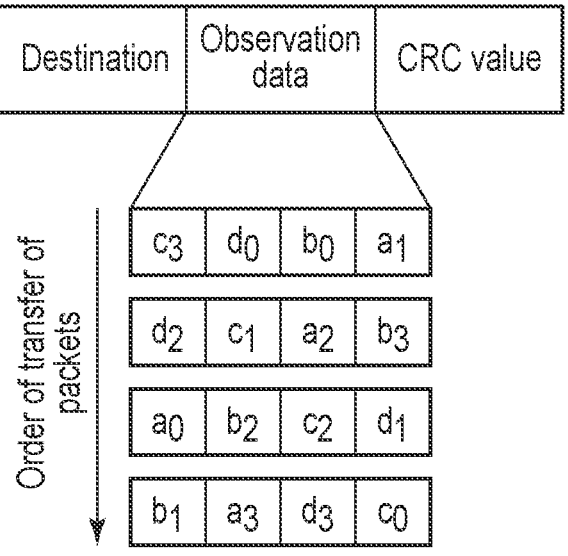
FIG. 8 is a diagram for explaining a packet transferred from the radar device to a host machine.

Specifically, assuming that the plurality of pieces of second observation data are the pieces of observation data a' to d' described above, the data transfer unit 115 sequentially transfers, for example, a packet including the observation data a' (that is, the pieces of ADC data $c_3$, $d_0$, $b_0$, and $a_1$), a packet including the observation data b' (that is, the pieces of ADC data $d_2$, $c_1$, $a_2$, and $b_3$), a packet including the observation data c' (that is, the pieces of ADC data $a_0$, $b_2$, $c_2$, and $d_1$), and a packet including the observation data d' (that is, the pieces of ADC data $b_1$, $a_3$, $d_3$, and $c_0$) as illustrated in FIG. 8. In addition, for example, a destination indicating the host machine 12 and a cyclic redundancy check (CRC) value for error detection are added to the packet including each of the pieces of observation data a' to d'.

Although it is possible to detect occurrence of an error (data error) in the packet with the CRC value described above, since the present embodiment is configured to reduce an influence of a data error, it is not necessary for the host machine 12 to detect a data error. However, in a case where occurrence of a data error is detected, processing of replacing the data with zero may be executed.

The radar data transferred in step S9 is received by the data reception unit 122 included in the host machine 12. In this case, the deinterleaver 123 deinterleaves the plurality of pieces of second observation data included in the radar data received by the data reception unit 122 (step S10).

The processing of step S10 is executed based on the seed held in the deinterleaver 123 (the seed known in the interleaver 114 and the deinterleaver 123). As a result, the plurality of pieces of ADC data included in the plurality of pieces of second observation data are rearranged, and the plurality of pieces of second observation data are converted into the plurality of pieces of first observation data. For example, in a case where the plurality of pieces of second observation data are the pieces of observation data a' to d' described above, the pieces of observation data a' to d' are converted into the pieces of observation data a to d by executing the processing of step S10. The plurality of pieces of first observation data converted from the plurality of pieces of second observation data in this manner are output to the processing unit 124.

Although a case where the radar signal is transmitted from the transmitter antenna 1a in step S5 has been described here, for example, in a case where the processing of step S10 is executed, the transmitter antenna 1a is switched to the transmitter antenna 1b, and the processing returns to step S5 and is repeated. Although the detailed description is omitted, in a case where the pieces of observation data e to h illustrated in FIG. 3 are acquired as the plurality of pieces of first observation data in step S7 in this case, the plurality of pieces of ADC data included in the pieces of observation data e to h are interleaved in the interleaver 114 to be converted into the pieces of observation data e' to h' (the plurality of pieces of second observation data). The radar data including the pieces of observation data e' to h' converted from the pieces of observation data e to h in this manner is transferred to the host machine 12 by the data transfer unit 115.

In this case, the radar data transferred by the data transfer unit 115 is received by the data reception unit 122, and the pieces of observation data e' to h' included in the radar data are deinterleaved by the deinterleaver 123 to be converted into the pieces of observation data e to h. The pieces of observation data e to h converted from the pieces of observation data e' to h' in this manner are output from the deinterleaver 123 to the processing unit 124.

Figure 6:
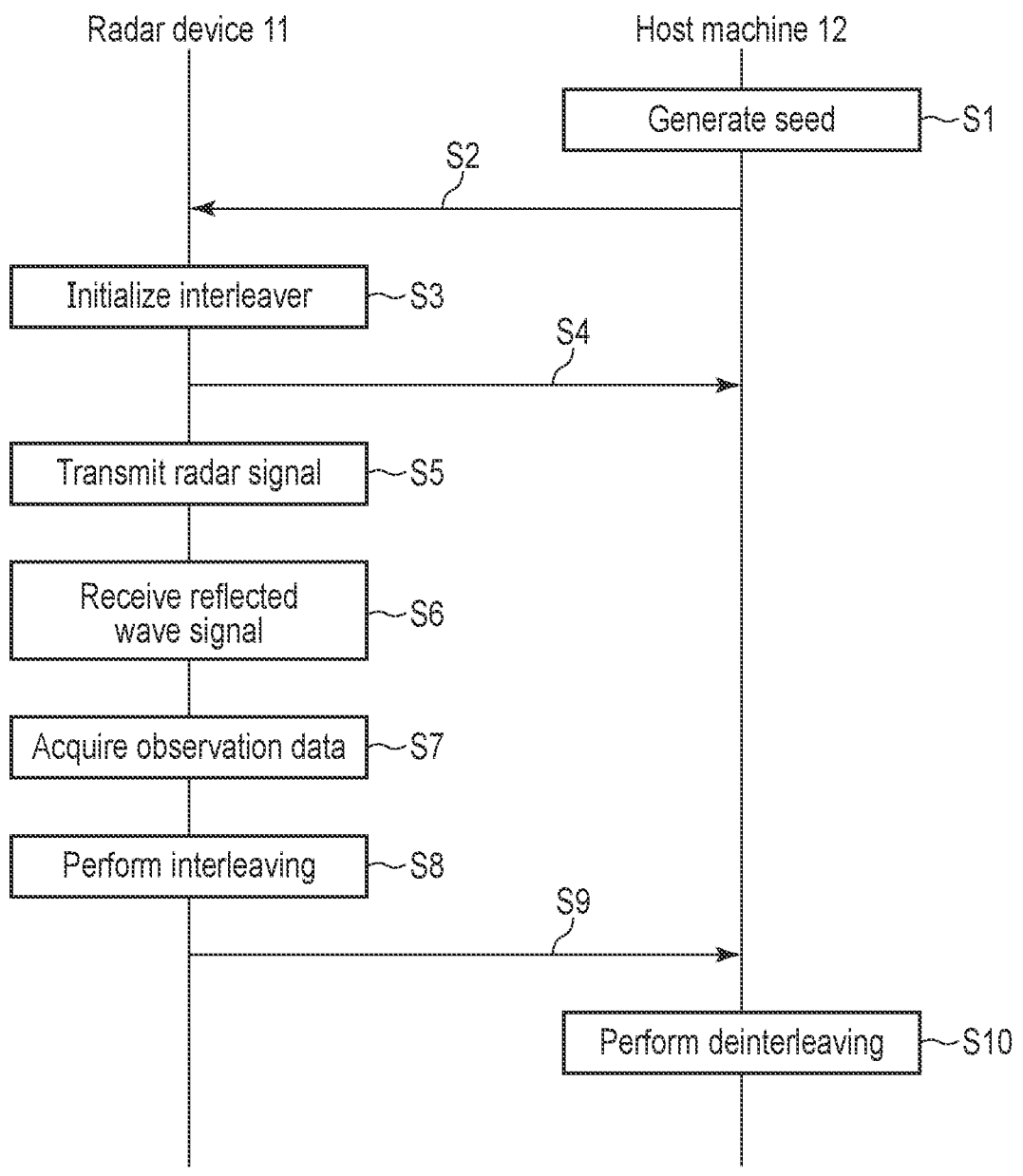
FIG. 6 is a sequence chart illustrating an example of a processing procedure of the radar system according to the first embodiment.

Although not illustrated in FIG. 6, the processing unit 124 executes arithmetic processing (for example, processing for measuring a distance to an object) using the plurality of pieces of first observation data (for example, the pieces of observation data a to d and the pieces of observation data e to h) output from the deinterleaver 123 as described above.

Although it has been described here that the transmitter antennas 1a and 1b each transmit a radar signal once, the transmission of the radar signal (that is, the processing of step S5 and the subsequent steps) may be repeated a predetermined number of times while switching the transmitter antennas 1a and 1b. In addition, although it has been described here that the transmitter antenna 1b transmits a radar signal after the transmitter antenna 1a transmits a radar signal, the order in which the transmitter antennas 1a and 1b transmit the radar signals (that is, the order of switching between the transmitter antennas 1a and 1b) may be changed as appropriate. In addition, one of the transmitter antennas 1a and 1b may continuously transmit a radar signal a plurality of times.

In the example illustrated in FIG. 6, it has been described that the seed used for interleaving and deinterleaving is generated on the host machine 12 side, but the seed may be generated on the radar device 11 side, for example. In this case, it is sufficient that the seed generation unit 121 included in the host machine 12 is omitted, the radar device 11 includes a functional unit corresponding to the seed generation unit 121, and the seed generated on the radar device 11 side is shared by the interleaver 114 and the deinterleaver 123 (the host machine 12). Furthermore, the seed used for interleaving and deinterleaving may be prepared (generated) outside the radar system 10 (the radar device 11 and the host machine 12), for example, and may be reported (transmitted) to the radar device 11 and the host machine 12.

As described above, in the present embodiment, the radar device 11 is, for example, a MIMO radar adopting the FMCW method, and includes the plurality of transmitter antennas 1a and 1b that transmit radar signals and the plurality of receiver antennas 2a to 2d that receive radar echoes based on reflected waves of the transmitted radar signals. In addition, the radar device 11 acquires the plurality of pieces of first observation data including the plurality of pieces of ADC data (partial data) having continuity based on the radar echo received by each of the plurality of receiver antennas 2a to 2d, converts the acquired plurality of pieces of first observation data into the plurality of pieces of second observation data including the plurality of pieces of ADC data having discontinuity (that is, the second observation data having a low correlation with the first observation data), and transfers (radar data including) the plurality of pieces of second observation data to the host machine 12 (processing device). In the present embodiment, the host machine 12 (processing device) converts the plurality of pieces of second observation data transferred from the radar device 11 into the plurality of pieces of first observation data, and executes arithmetic processing using the plurality of pieces of first observation data.

In the present embodiment, the plurality of pieces of ADC data included in the plurality of pieces of first observation data are interleaved to convert the plurality of pieces of first observation data into the plurality of pieces of second observation data. Furthermore, in the present embodiment, the plurality of pieces of ADC data included in the plurality of pieces of second observation data are deinterleaved to convert the plurality of pieces of second observation data into the plurality of pieces of first observation data. The interleaving and deinterleaving described above are performed based on the seed shared by the radar device 11 (the interleaver 114) and the host machine 12 (the deinterleaver 123) (the seed for rearranging the plurality of pieces of ADC data).

In the present embodiment, with the above-described configuration, it is possible to suppress an influence of a data error that occurs in the transfer of the radar data.

Here, as illustrated in FIG. 9, it is assumed that radar data 20 including the pieces of observation data a' to d' converted from the pieces of observation data a to d by interleaving the plurality of pieces of ADC data included in the pieces of observation data a to d is transferred from the radar device 11 to the host machine 12.

It is assumed that the observation data a' (the pieces of ADC data $c_3$, $d_0$, $b_0$, and $a_1$) included in the radar data 20 is transferred in a packet 20a, the observation data b' (the pieces of ADC data $d_2$, $c_1$, $a_2$, and $b_3$) is transferred in a packet 20b, the observation data c' (the pieces of ADC data $a_0$, $b_2$, $c_2$, and $d_1$) is transferred in a packet 20c, and the observation data d' (the pieces of ADC data $b_1$, $a_3$, $d_3$, and $c_0$) is transferred in a packet 20d.

Once the above-described radar data 20 (the packets 20a to 20d) is received by the data reception unit 122 included in the host machine 12, the pieces of observation data a' to d' are converted into the pieces of observation data a to d by deinterleaving the plurality of pieces of ADC data included in the pieces of observation data a' to d' included in radar data 6.

Here, it is assumed that a data error (packet error) occurs in the packet 20d in the transfer of the radar data 6 from the radar device 11 to the host machine 12. This data error can be detected based on a CRC value added to the packet 20d.

In this case, for example, the observation data d among the pieces of observation data a to d converted from the pieces of observation data a' to d' is different from the observation data d generated in (the A/D converter 113 included in) the radar device 11, and is data in which the ADC data $d_3$ among the plurality of pieces of ADC data $d_0$ to $d_3$ is lost.

However, in the comparative example of the present embodiment described above, in a case where a data error occurs in one packet, for example, all the pieces of ADC data included in the observation data d are lost, and thus, the observation data d cannot be used for distance measurement. However, in the present embodiment, for example, only some (ADC data $d_3$) of the plurality of pieces of ADC data $d_0$ to $d_3$ included in the observation data d are lost, and the observation data d including the pieces of ADC data $d_0$ to $d_2$ other than the ADC data $d_3$ can be used for distance measurement.

Figure 10:
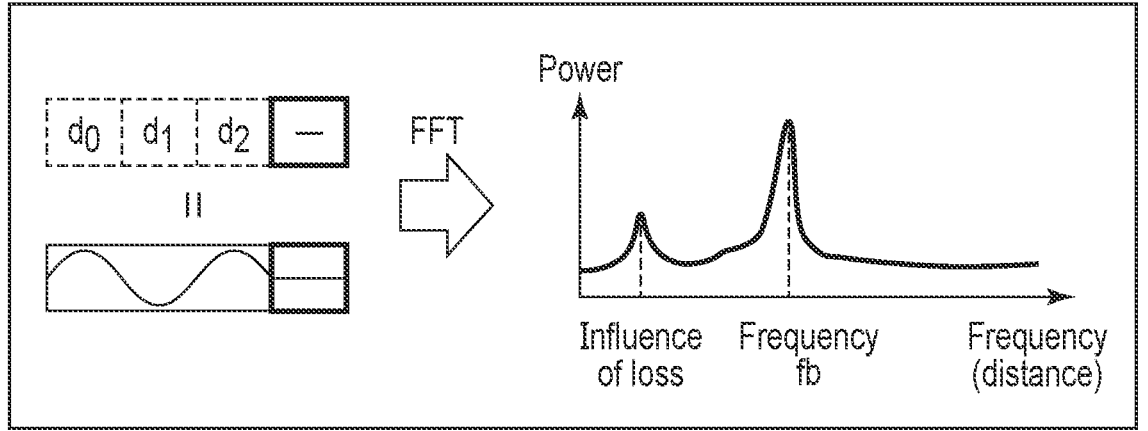
FIG. 10 is a diagram for explaining an influence of a data error in the first embodiment.

Specifically, as illustrated in FIG. 10, for example, an IF signal represented by the observation data d including the pieces of ADC data $d_0$ to $d_2$ other than the ADC data $d_3$ has a waveform different from that of an IF signal represented by the observation data d including the pieces of ADC data $d_0$ to $d_3$. However, in a case where FFT is applied to the IF signal represented by the observation data d in which the ADC data $d_3$ is lost, although there is an influence of the loss of the ADC data $d_3$ (an influence of the data error), a peak appears at the position of the beat frequency $f_b$, and a distance corresponding to the position of the peak can be obtained.

In other words, for example, as described in the comparative example of the present embodiment, in a case where all of the pieces of ADC data $d_0$ to $d_3$ included in the observation data d are lost, a distance component (distance information) in the observation data d is lost, and a distance to an object cannot be obtained even if the FFT is applied. However, in the present embodiment, only (a sampling value of) a part of the IF signal (sine wave) represented by the observation data d is lost (the data error is dispersed to a plurality of pieces of observation data). Therefore, periodic continuity of the sine wave is not lost, and the distance to the object can be obtained by applying the FFT. That is, the IF signal represented by the observation data d is a sine wave having temporal continuity, and even if a discontinuous component of a short section exists (loss of a part of the ADC data occurs), the result of the FFT is not greatly affected.

Here, the observation data d illustrated in FIG. 9 has been described. However, since only a part of the IF signal (a part of the ADC data) is lost in the other pieces of observation data a to c, each of the pieces of observation data a to c can be used for distance measurement.

Furthermore, the radar device 11 according to the present embodiment is the MIMO radar as described above, and assuming that the plurality of pieces of first observation data including the plurality of pieces of ADC data arranged in the time direction are arranged in the spatial direction (the arrangement direction of the transmitter antennas 1a and 1b and the receiver antennas 2a to 2d), the plurality of pieces of ADC data included in the plurality of pieces of first observation data are interleaved in the time direction and the spatial direction. With this configuration, it is possible to avoid transfer of at least the plurality of pieces of ADC data included in the same first observation data in one packet, and even in a case where a data error occurs in the packet, it is possible to avoid temporal discontinuity of a long section in the first observation data (that is, loss of a plurality of pieces of temporally adjacent ADC data).

For example, whether or not all of the plurality of pieces of ADC data included in the same first observation data are transferred in one packet differs depending on the size of the first observation data. That is, for example, in a case where four pieces of ADC data can be transferred in one packet, when the number of pieces of ADC data included in the first observation data is five or more, if the plurality of pieces of ADC data are not adjacent to each other in the second observation data (for example, the observation data a') and have discontinuity, the plurality of pieces of ADC data are not transferred in the same packet in some cases, even if, for example, the plurality of pieces of ADC data (for example, the pieces of ADC data $a_0$ and $a_1$ included in the observation data a) included in the first observation data are included in the plurality of pieces of ADC data included in the second observation data converted by interleaving. In the present embodiment, in consideration of such a point, the plurality of pieces of ADC data may be interleaved based on the size of the first observation data (the size of the observation data acquired by one radar emission).

In addition, since the size of data that can be transferred in the packet described above (a capacity per packet) is determined according to the communication scheme adopted between the radar device 11 and the host machine 12, the plurality of pieces of ADC data included in the plurality of pieces of first observation data may be interleaved according to the communication scheme (the size of data that can be transferred in the packet).

Meanwhile, in the interleaving according to the present embodiment, the pieces of ADC data are randomly rearranged in the time direction and the spatial direction, so that it is possible to obtain a suitable characteristic for suppressing an influence of a data error, but a predetermined rule may be applied to the interleaving.

Specifically, for example, the accuracy of distance measurement is higher when arithmetic processing in which the pieces of observation data b and d having spatial discontinuity are lost (that is, only the pieces of observation data a and c are used) among the pieces of observation data a to d illustrated in FIG. 7 and the like is executed than when arithmetic processing in which the pieces of observation data c and d having spatial continuity are lost (that is, only the pieces of observation data a and b are used) is executed. Therefore, in the present embodiment, for example, interleaving may be performed in such a way that pieces of ADC data having spatial continuity such as the pieces of ADC data included in the observation data c and the pieces of ADC data included in the observation data d are not included in the same packet (that is, the pieces of ADC data are discontinuous).

For example, whether or not (the pieces of ADC data included in) the pieces of observation data a to d have spatial continuity is considered to vary depending on the arrangement of the transmitter/receiver antennas (the transmitter antennas 1a and 1b and the receiver antennas 2a to 2d), the order in which the radar signals are transmitted (the order of switching between the transmitter antennas 1a and 1b), and the like. Therefore, in the present embodiment, the plurality of pieces of ADC data included in the pieces of observation data a to d may be interleaved based on the arrangement of the transmitter/receiver antennas or the order in which the radar signals are transmitted.

Furthermore, for example, the pieces of observation data a to d include the plurality of pieces of ADC data arranged in chronological order. However, in a case where the plurality of pieces of ADC data (for example, the ADC data $a_1$ included in the observation data a, the ADC data by included in the observation data b, and the like) arranged in the same chronological order are all lost, a peak may appear at the same position corresponding to the loss in the FFT result for the observation data a and the FFT result for the observation data b, and the peak may adversely affect the distance measurement. Therefore, in the present embodiment, for example, pieces of ADC data arranged in the same chronological order in the plurality of pieces of ADC data included in the observation data a and the plurality of pieces of ADC data included in the observation data b may be interleaved in such a way as not to be included in the same packet (that is, the pieces of ADC data are discontinuous).

In the present embodiment, it has been described that the plurality of pieces of ADC data may be interleaved based on the arrangement of the transmitter/receiver antennas, the order in which the radar signals are transmitted, the size of the observation data, and the like as described above, but the interleaving may be performed based on all of these or may be performed based on at least one of these. As a result, there is a possibility that more efficient interleaving can be implemented in order to suppress an influence of a data error.

In addition, there is a possibility that two pieces of ADC data among the plurality of pieces of ADC data (for example, the pieces of ADC data $a_0$ to $a_3$) included in one piece of observation data are transferred in the same packet as a result of interleaving of the plurality of pieces of ADC data included in the plurality of pieces of first observation data, and it is preferable that the two pieces of ADC data are pieces of ADC data having temporal discontinuity. That is, the interleaving according to the present embodiment is performed in such a way that, for example, the pieces of ADC data $a_1$ and $a_3$ are lost instead of the pieces of ADC data $a_1$ and $a_2$ to maintain periodicity of the IF signal as much as possible even if the loss occurs.

Furthermore, in the present embodiment, it has been described that the radar device 11 interleaves the plurality of pieces of ADC data included in the plurality of pieces of first observation data to convert the plurality of pieces of first observation data into the plurality of pieces of second observation data. However, converting the plurality of pieces of first observation data into the plurality of pieces of second observation data may include scrambling the plurality of pieces of ADC data included in the plurality of pieces of first observation data. In a case where the plurality of pieces of first observation data are converted into the plurality of pieces of second observation data by scrambling in the radar device 11 in this manner, it is sufficient if the host machine 12 is configured to perform descrambling to convert the plurality of pieces of first observation data into the plurality of pieces of second observation data.

Furthermore, in the present embodiment, the radar device 11 has been described as a MIMO radar adopting the FMCW method, but the radar device 11 may adopt a radar modulation method other than the FMCW method. Specifically, the present embodiment may be applied to a radar system including a radar device that transmits a short pulse (rectangular wave) as a radar signal, for example, as long as observation data representing a sine wave is acquired.

As described above, according to the present embodiment, an influence of a data error occurring in the transfer of the radar data (the plurality of pieces of observation data) is dispersed by rearranging the plurality of pieces of ADC data in the time direction and the space direction, so that it is possible to avoid that some pieces of observation data among the plurality of pieces of observation data cannot be used for distance measurement (that is, retransfer of the observation data).

In the present embodiment, it has been described that the plurality of packets generated from (the radar data including) the plurality of pieces of second observation data are sequentially transferred (that is, the radar data is transferred in the packet) according to the communication scheme adopted between the radar device 11 and the host machine 12. However, in the present embodiment, for example, the plurality of pieces of ADC data may be sequentially transferred as they are. In such a configuration, as described above, as the plurality of pieces of first observation data are converted into the plurality of pieces of second observation data and then transferred, for example, even in a case where a data error occurs in pieces of ADC data having temporal continuity among the plurality of pieces of ADC data sequentially transferred, it is possible to avoid a situation in which a plurality of pieces of ADC data (that is, pieces of ADC data having continuity) included in the same first observation data are collectively lost and the first observation data cannot be used for distance measurement.

Although the radar system 10 including the radar device 11 and the host machine 12 has been described in the present embodiment, the radar system 10 may have a configuration (hereinafter, referred to as a modification of the present embodiment) including a data transfer device 13 arranged between the radar device 11 and the host machine 12 as illustrated in FIG. 11.

In this case, the data transfer device 13 includes an interleaver 131 corresponding to the interleaver 114 included in the above-described radar device 11, and a data transfer unit 132 corresponding to the data transfer unit 115 included in the radar device 11. The interleaver 131 interleaves the plurality of pieces of first observation data output from the radar device 11 (the A/D converter 113) to convert the plurality of pieces of first observation data into the plurality of pieces of second observation data. The data transfer unit 132 transfers the radar data including the plurality of pieces of second observation data output from the interleaver 131 to the host machine 12. The radar device 11 included in the radar system 10 illustrated in FIG. 11 has a configuration in which the interleaver 114 and the data transfer unit 115 illustrated in FIG. 5 are omitted.

In the modification of the present embodiment, as the radar data is transferred from the radar device 11 to the host machine 12 via the data transfer device 13, it is possible to suppress an influence of a data error occurring in the transfer of the radar data similarly to the present embodiment described above.

When the radar system is used in a case of inspecting an object possessed by a person passing through a predetermined region (that is, performing a security check) as described above, it is necessary to sequentially execute the arithmetic processing in an environment where people pass one after another, and thus, it is considered that high real-time performance is required for the radar system. Since the radar system 10 according to the present embodiment and the modification of the present embodiment does not require retransmission of the observation data (packet) from the radar device 11 to the host machine 12 and has a short processing latency, it can be said that the radar system is suitable for an application requiring high real-time performance such as the security check as described above.

Second Embodiment

Next, a second embodiment will be described. In the present embodiment, a detailed description of the same parts as those of the first embodiment described above will be omitted, and parts different from those of the first embodiment will be mainly described.

In the first embodiment described above, it has been described that radar data is transferred every time a radar signal is transmitted from one transmitter antenna (that is, in units of transmitter antennas). However, the present embodiment is different from the first embodiment in that radar data is transferred after radar signals are transmitted from a plurality of transmitter antennas.

FIG. 12 illustrates an example of a configuration of a radar system according to the present embodiment. In FIG. 12, the same parts as those in FIG. 5 described above are denoted by the same reference numerals, and a detailed description thereof is omitted.

As illustrated in FIG. 12, a radar device 11 included in a radar system 10 includes a buffer 116. The buffer 116 is implemented by a memory or the like included in the radar device 11.

As described in the first embodiment, an A/D converter 113 outputs a plurality of pieces of first observation data, and the buffer 116 stores (accumulates) the plurality of pieces of observation data output from the A/D converter 113.

Although the detailed description is omitted, in a case where the radar device 11 includes transmitter antennas 1a and 1b and receiver antennas 2a to 2d as illustrated in FIG. 12, when a radar signal is transmitted from the transmitter antenna 1a, a plurality of pieces of first observation data obtained by A/D converting each of IF signals generated by mixing the radar signal and radar echoes received by the respective receiver antennas 2a to 2d (hereinafter, referred to as the plurality of pieces of first observation data corresponding to the transmitter antenna 1a) are output from the A/D converter 113. The buffer 116 stores the plurality of pieces of first observation data corresponding to the transmitter antenna 1a output from the A/D converter 113 in this manner.

Furthermore, in a case where a radar signal is transmitted from the transmitter antenna 1b, a plurality of pieces of first observation data obtained by A/D converting each of IF signals generated by mixing the radar signal and the radar echoes received by the respective receiver antennas $2a$ to $2d$ (hereinafter, referred to as the plurality of pieces of first observation data corresponding to the transmitter antenna $1b$) are output from the A/D converter 113. The buffer 116 stores the plurality of pieces of first observation data corresponding to the transmitter antenna $1b$ output from the A/D converter 113 in this manner.

In this case, an interleaver 114 interleaves (rearranges) a plurality of pieces of ADC data included in the plurality of pieces of first observation data (the plurality of pieces of first observation data corresponding to the transmitter antenna $1a$ and the plurality of pieces of first observation data corresponding to the transmitter antenna $1b$) stored (accumulated) in the buffer 116, thereby converting the plurality of pieces of first observation data into a plurality of pieces of second observation data.

Next, an example of a processing procedure of the radar system 10 according to the present embodiment will be described with reference to a sequence chart of FIG. 13.

First, processing of steps S11 to S17 corresponding to the processing of steps S1 to S7 illustrated in FIG. 6 described above is executed. Here, it is assumed that a radar signal is transmitted from the transmitter antenna $1a$ in step S15, and the plurality of pieces of first observation data corresponding to the transmitter antenna $1a$ are acquired in step S17.

In this case, the plurality of pieces of first observation data corresponding to the transmitter antenna $1a$ acquired in step S17 are stored in the buffer 116 (step S18).

Next, it is determined whether or not radar signals have been transmitted from all the transmitter antennas included in the radar device 11 (step S19). As illustrated in FIG. 12, assuming that the radar device 11 includes the transmitter antennas $1a$ and $1b$ and the radar signal is transmitted from the transmitter antenna $1a$ in step S15 described above, since the radar signal is not transmitted from the transmitter antenna $1b$, it is determined in step S19 that the radar signals are not transmitted from all the transmitter antennas.

As described above, in a case where it is determined that the radar signals are not transmitted from all the transmitter antennas (NO in step S19), the processing returns to step S15 and is repeated. As described above, assuming that the radar signal has already been transmitted from the transmitter antenna $1a$, the radar signal is transmitted from the transmitter antenna $1b$ in step S15, and the processing of steps S16 and S17 is executed. In step S17, the plurality of pieces of first observation data corresponding to the transmitter antenna $1b$ are acquired.

In this case, the plurality of pieces of first observation data corresponding to the transmitter antenna $1b$ acquired in step S17 are stored in the buffer 116 (step S18).

Next, the processing of step S19 described above is executed. Here, since the radar signals have been transmitted from both the transmitter antennas $1a$ and $1b$, it is determined in step S19 that the radar signals have been transmitted from all the transmitter antennas.

In a case where it is determined that the radar signals have been transmitted from all the transmitter antennas as described above (YES in step S19), the interleaver 114 reads the plurality of pieces of first observation data corresponding to the transmitter antennas $1a$ and $1b$ stored in the buffer 116 from the buffer 116, and interleaves the plurality of pieces of ADC data included in the plurality of pieces of first observation data (step S20).

Hereinafter, the plurality of pieces of ADC data interleaved in step S20 will be specifically described with reference to FIG. 14. Here, a case where the plurality of pieces of first observation data corresponding to the transmitter antenna $1a$ are pieces of observation data a to d described above in FIG. 3, the plurality of pieces of first observation data corresponding to the transmitter antenna $1b$ are pieces of observation data e to h described in FIG. 3, and pieces of ADC data $a_0$ to $a_3$, $b_0$ to $b_3$, $c_0$ to $c_3$, $d_0$ to $d_3$, $e_0$ to $e_3$, $f_0$ to $f_3$, $g_0$ to $g_3$, and $h_0$ to $h_3$ included in each of the pieces of observation data a to h are interleaved (rearranged) will be described.

First, the interleaver 114 interleaves the plurality of pieces of ADC data arranged in the time direction in each of the pieces of observation data a to h. In the example illustrated in FIG. 14, for example, the plurality of pieces of ADC data $a_0$ to $a_3$ included in the observation data a are rearranged in the order of $a_0$, $a_3$, $a_2$, and $a_1$. Although interleaving for the pieces of ADC data $a_0$ to $a_3$ included in the observation data a has been described here, the same applies to the plurality of pieces of ADC data included in each of the pieces of observation data b to h. That is, the pieces of ADC data $b_0$ to $b_3$ included in the observation data b are rearranged in the order of $b_1$, $b_2$, $b_0$, and $b_3$. Furthermore, the pieces of ADC data $c_0$ to $c_3$ included in the observation data c are rearranged in the order of $c_3$, $c_1$, $c_2$, and $c_0$. Furthermore, the pieces of ADC data $d_0$ to $d_3$ included in the observation data d are rearranged in the order of $d_2$, $d_0$, $d_3$, and $d_1$. Furthermore, the pieces of ADC data $e_0$ to $e_3$ included in the observation data e are rearranged in the order of $e_0$, $e_3$, $e_2$, and $e_1$. Furthermore, the pieces of ADC data $f_0$ to $f_3$ included in the observation data f are rearranged in the order of $f_1$, $f_2$, $f_0$, and $f_3$. In addition, the pieces of ADC data $g_0$ to $g_3$ included in the observation data g are rearranged in the order of $g_3$, $g_1$, $g_2$, and $g_0$. Furthermore, the pieces of ADC data $h_0$ to $h_3$ included in the observation data h are rearranged in the order of $h_2$, $h_0$, $h_3$, and $h_1$.

Next, the interleaver 114 performs interleaving of the plurality of pieces of ADC data arranged in the spatial direction for the plurality of pieces of ADC data (arrangement) interleaved in the time direction as described above. In the example illustrated in FIG. 14, for example, the pieces of ADC data $a_0$, $b_1$, $c_3$, $d_2$, $e_0$, $f_1$, $g_3$, and $h_2$ are rearranged in the order of $g_3$, $d_2$, $e_0$, $b_1$, $c_3$, $h_2$, $a_0$, and $f_1$. In addition, the pieces of ADC data $a_3$, $b_2$, $c_1$, $d_0$, $e_3$, $f_2$, $g_1$, and $h_0$ are rearranged in the order of $d_0$, $g_1$, $b_2$, $e_3$, $h_0$, $c_1$, $f_2$, and $a_3$. In addition, the pieces of ADC data $a_2$, $b_0$, $c_2$, $d_3$, $e_2$, $f_0$, $g_2$, and $h_3$ are rearranged in the order of $b_0$, $e_2$, $g_2$, $d_3$, $f_0$, $a_2$, $c_2$ and $h_3$. Furthermore, the pieces of ADC data $a_1$, $b_3$, $c_0$, $d_1$, $e_1$, $f_3$, $g_0$, and $h_1$ are rearranged in the order of $e_1$, $b_3$, $d_1$, $g_0$, $a_1$, $f_3$, $h_1$, and $c_0$.

Note that the processing of step S20 is similar to the processing of step S8 illustrated in FIG. 6 described above except that the number of pieces of ADC data to be interleaved is different.

In a case where such processing of step S20 is executed, the plurality of pieces of first observation data corresponding to the transmitter antennas $1a$ and $1b$ including the plurality of pieces of ADC data having continuity are converted into the plurality of pieces of second observation data including the plurality of pieces of ADC data having discontinuity, similarly to the first embodiment described above. In the example illustrated in FIG. 14, the observation data a including the pieces of ADC data $a_0$ to $a_3$, the observation data b including the pieces of ADC data $b_0$ to $b_3$, the observation data c including the pieces of ADC data $c_0$ to $c_3$, and the observation data d including the pieces of ADC data $d_0$ to $d_3$ (the plurality of pieces of first observation data corresponding to the transmitter antenna $1a$), and the observation data e including the pieces of ADC data $e_0$ to $e_3$, the observation data f including the pieces of ADC data $f_0$ to $f_3$, the observation data g including the pieces of ADC data $g_0$ to $g_3$, and the observation data h including the pieces of ADC data $h_0$ to $h_3$ (the plurality of pieces of first observation data corresponding to the transmitter antenna $1b$) are converted into, for example, observation data a' including the pieces of ADC data $g_3$, $d_0$, $b_0$, and $e_1$, observation data b' including the pieces of ADC data $d_2$, $g_1$, $e_2$, and $b_3$, observation data c' including the pieces of ADC data $e_0$, $b_2$, $g_2$, and $d_1$, observation data d' including the pieces of ADC data by, $e_3$, $d_3$, and $g_0$, observation data e' including the pieces of ADC data $c_3$, $h_0$, $f_0$, and $a_1$, observation data f' including the pieces of ADC data $h_2$, $c_1$, $a_2$, and $f_3$, observation data g' including the pieces of ADC data $a_0$, $f_2$, $c_2$, and $h_1$, and observation data h' including the pieces of ADC data $f_1$, $a_3$, $h_3$, and $c_0$ (the plurality of pieces of second observation data).

Next, a data transfer unit 115 transfers, to a host machine 12, radar data including the plurality of pieces of second observation data converted from the plurality of pieces of first observation data corresponding to the transmitter antennas $1a$ and $1b$ by executing the processing of step S20 (step S21).

Specifically, assuming that the plurality of pieces of second observation data are the pieces of observation data a' to h' described above, the data transfer unit 115 sequentially transfers, for example, a packet including the observation data a' (that is, the pieces of ADC data $g_3$, $d_0$, $b_0$, and $e_1$), a packet including the observation data b' (that is, the pieces of ADC data $d_2$, $g_1$, $e_2$, and $b_3$), a packet including the observation data c' (that is, the pieces of ADC data $e_0$, $b_2$, $g_2$, and $d_1$), a packet including the observation data d' (that is, the pieces of ADC data $b_1$, $e_3$, $d_3$, and $g_0$), a packet including the observation data e' (that is, the pieces of ADC data $c_3$, $h_0$, $f_0$, and $a_1$), a packet including the observation data f' (that is, the pieces of ADC data $h_2$, $c_1$, $a_2$, and $f_3$), a packet including the observation data g' (that is, the pieces of ADC data $a_0$, $f_2$, $c_2$, and $h_1$), and a packet including the observation data h' (that is, the pieces of ADC data $f_1$, $a_3$, $h_3$, and $c_0$) as illustrated in FIG. 15. In addition, a destination and a CRC value are added to the packet including each of the pieces of observation data a' to h' similarly to the first embodiment described above.

The radar data transferred in step S21 is received by a data reception unit 122 included in the host machine 12. In this case, a deinterleaver 123 deinterleaves the plurality of pieces of second observation data included in the radar data received by the data reception unit 122 (step S22).

In step S22, the plurality of pieces of ADC data included in the plurality of pieces of second observation data are rearranged, and the plurality of pieces of second observation data are converted into the plurality of pieces of first observation data corresponding to the transmitter antennas $1a$ and $1b$. For example, in a case where the plurality of pieces of second observation data are the pieces of observation data a' to h' described above, the pieces of observation data a' to h' are converted into the pieces of observation data a to h described above by executing the processing of step S22. The plurality of pieces of first observation data corresponding to the transmitter antennas $1a$ and $1b$ converted from the plurality of pieces of second observation data in this manner are output from the deinterleaver 123 to the processing unit 124.

Although not illustrated in FIG. 13, the processing unit 124 executes arithmetic processing (for example, processing for measuring a distance to an object) using the plurality of pieces of first observation data (for example, the pieces of observation data a to h) corresponding to the transmitter antennas $1a$ and $1b$ output from the deinterleaver 123 as described above.

In the example illustrated in FIG. 13, the description has been given assuming that the processing of step S20 is executed (that is, the plurality of pieces of first observation data corresponding to the transmitter antennas $1a$ and $1b$ are set as data transfer targets) in a case where it is determined in step S19 that the radar signals have been transmitted from all the transmitter antennas, but a timing at which the processing of step S20 is executed may be determined based on another viewpoint. Specifically, the processing of step S20 may be executed, for example, after radar signal transmission is performed a predetermined number of times (that is, after radar observation is performed an arbitrary number of times), or may be executed when a free space of the buffer 116 becomes equal to or less than a predetermined value. Furthermore, the processing of step S20 may be executed, for example, at a timing when the amount of first observation data determined from the viewpoint of the maximum execution transfer speed of a transfer bus between the radar device 11 and the host machine 12 is accumulated in the buffer 116.

Furthermore, in the present embodiment, it has been described that the plurality of pieces of first observation data corresponding to the transmitter antennas $1a$ and $1b$ are stored in the buffer 116, but the plurality of pieces of first observation data corresponding to the transmitter antennas $1a$ and $1b$ (that is, all the transmitter antennas) do not necessarily need to be stored in the buffer 116. That is, for example, in a case where one of the transmitter antennas $1a$ and $1b$ continuously transmits a radar signal, the plurality of pieces of first observation data of the first time to the n-th time (n is an integer of 2 or more) corresponding to the transmitter antenna may be stored in the buffer 116.

As described above, in the present embodiment, the radar device 11 includes the buffer 116 that stores (accumulates) the plurality of pieces of first observation data acquired each time the radar signal is transmitted from the transmitter antennas $1a$ and $1b$, and converts the plurality of pieces of first observation data (for example, the plurality of pieces of first observation data corresponding to the transmitter antennas $1a$ and $1b$) stored in the buffer 116 into the plurality of pieces of second observation data.

Here, in the present embodiment, since data transfer is performed after the plurality of pieces of first observation data acquired by transmission of the plurality of radar signals are stored in the buffer 116 (that is, it is necessary to wait until data to be transferred is accumulated in the buffer 116), there is a possibility that the processing speed of the radar system 10 as a whole is lower as compared with the first embodiment described above.

However, the present embodiment is configured to interleave a larger number of ADC data than the first embodiment described above, and can be said to have higher error dispersion capability (that is, it is possible to further reduce a possibility that a plurality of pieces of ADC data included in the same first observation data are lost at the same time) than the first embodiment.

In the present embodiment, it has been described that the radar device 11 included in the radar system 10 according to the first embodiment described above includes the buffer 116, but the present embodiment may be combined with the modification of the first embodiment described above. In this case, for example, the buffer 116 may be provided downstream of the A/D converter 113 of the radar device 11 or upstream of the interleaver 131 of the data transfer device 13 illustrated in FIG. 11.

Third Embodiment

Next, a third embodiment will be described. In the present embodiment, a detailed description of the same parts as those of the first and second embodiments described above will be omitted, and parts different from those of the first and second embodiments will be mainly described.

In the first and second embodiments described above, it is assumed that the radar device is a MIMO radar (that is, a plurality of transmitter antennas and a plurality of receiver antennas are included), but the present embodiment is different from the first and second embodiments in that the radar device includes one transmitter antenna and one receiver antenna (that is, a pair of transmitter/receiver antennas).

FIG. 16 illustrates an example of a configuration of the radar system according to the present embodiment. In FIG. 16, the same parts as those in FIG. 12 described above are denoted by the same reference numerals, and a detailed description thereof is omitted.

As illustrated in FIG. 16, a radar system 10 according to the present embodiment is the same as the radar system 10 according to the second embodiment illustrated in FIG. 12 described above except that a radar device 11 includes one transmitter antenna 1 instead of two transmitter antennas 1a and 1b and includes one receiver antenna 2 instead of four receiver antennas 2a to 2d.

Here, since the radar device 11 described in the first and second embodiments described above is a MIMO radar, radar signals are transmitted from the transmitter antennas 1a and 1b in a time division manner, but a radar device 11 in the present embodiment has a configuration including one transmitter antenna 1. In this case, the radar device 11 operates in such a way that the transmitter antenna 1 transmits a radar signal a plurality of times while moving, for example. Accordingly, first observation data acquired each time the transmitter antenna 1 transmits the radar signal can be sequentially accumulated in a buffer 116.

In the present embodiment, a plurality of pieces of first observation data accumulated in the buffer 116 in this manner are interleaved.

Next, an example of a processing procedure of the radar system 10 according to the present embodiment will be described with reference to a sequence chart of FIG. 17.

First, processing of steps S31 to S34 corresponding to the processing of steps S11 to S14 illustrated in FIG. 13 described above is executed. Next, the transmitter antenna 1 transmits (emits) a radar signal generated by a synthesizer 111 (step S15).

Once the processing of step S15 is executed, steps S36 to S38 corresponding to the processing of steps S16 to S18 illustrated in FIG. 13 are executed. For example, in a case where the radar device 11 is a MIMO radar, since a plurality of receiver antennas are provided, a plurality of pieces of first observation data are acquired by one transmission of a radar signal, but in the present embodiment, the number of pieces of first observation data acquired by one transmission of a radar signal is one. That is, one piece of first observation data is acquired in step S37, and the first observation data is stored in the buffer 116 in step S38.

Next, it is determined whether or not to end radar observation (that is, radar signal transmission) in the radar device 11 (step S39). In step S39, for example, in a case where a predetermined number of radar signals have not been transmitted from the transmitter antenna 1 (that is, a predetermined number of pieces of first observation data are not stored in the buffer 116), it is determined that the radar observation is not to be ended. On the other hand, in a case where the predetermined number of radar signals have been transmitted from the transmitter antenna 1 (that is, the predetermined number of first observation data are stored in the buffer 116), it is determined that the radar observation is to be ended. Whether or not to end the radar observation may be determined based on another viewpoint (for example, a free space of the buffer 116 or the like).

In a case where it is determined that the radar observation is not to be ended (NO in step S39), the processing returns to step S35 and is repeated. That is, in the present embodiment, by repeatedly executing the processing of steps S35 to S38 while moving the radar device 11 as described above, the radar device 11 can acquire (accumulate in the buffer 116) the plurality of pieces of first observation data corresponding to the position of the radar device 11 (the transmitter antenna 1 and the receiver antenna 2).

On the other hand, in a case where it is determined that the radar observation is to be ended, the processing of steps S40 to S42 corresponding to the processing of steps S20 to S22 illustrated in FIG. 13 described above is executed.

That is, in the second embodiment described above, the plurality of pieces of first observation data acquired while switching the transmitter antenna that transmits the radar signal is stored in the buffer 116, whereas in the present embodiment, the plurality of pieces of first observation data acquired each time the radar signal is transmitted while moving the radar device 11 are stored in the buffer 116, which is different from the second embodiment. However, other processing in the radar system 10 according to the present embodiment is substantially the same as the processing described in the second embodiment.

As described above, in the present embodiment, with the configuration in which the plurality of pieces of first observation data acquired each time the radar signal is transmitted while moving the radar device 11 are stored in the buffer 116 and the plurality of pieces of first observation data stored in the buffer 116 are converted into the plurality of pieces of second observation data (that is, the plurality of pieces of first observation data are interleaved and transferred), even in a case where the radar device 11 is not a MIMO radar (that is, a configuration including a pair of transmitter/receiver antennas), it is possible to suppress (disperse) an influence of a data error occurring in the transfer of the radar data, similarly to the first and second embodiments described above.

The present embodiment may be applied to a configuration in which the data transfer device 13 is disposed between the radar device 11 and the host machine 12 as described in the modification of the first embodiment described above.

According to at least one embodiment described above, it is possible to provide a radar system, a data transfer device, and a method capable of suppressing an influence of a data error.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

With regard to the above-described embodiments, the following supplementary notes are further described.

(1)

A radar system including:

a radar device; and a processing device that is communicably connected to the radar device, wherein the radar device includes:

a transmitter antenna configured to transmit a radar signal;

a receiver antenna configured to receive a radar echo based on a reflected wave of the transmitted radar signal;

an acquisition unit configured to acquire a plurality of pieces of first observation data including a plurality of pieces of partial data having continuity based on the received radar echo;

a first conversion unit configured to convert the pieces of first observation data into a plurality of pieces of second observation data including the pieces of partial data having discontinuity; and a transfer unit configured to transfer the pieces of second observation data to the processing device, and the processing device includes:

a second conversion unit configured to convert the pieces of second observation data into the pieces of first observation data; and a processing unit configured to execute arithmetic processing using the pieces of first observation data converted from the pieces of second observation data.

(2)

The radar system according to item (1), wherein the radar device includes a multi-input multi-output (MIMO) radar including a plurality of transmitter antennas and a plurality of receiver antennas, the respective transmitter antennas are configured to transmit radar signals in a time division manner, the receiver antennas are configured to receive radar echoes based on reflected waves of the radar signals transmitted in a time division manner, and the acquisition unit is configured to acquire a plurality of pieces of first observation data based on the radar echoes received by the respective receiver antennas.

(3)

The radar system according to item (1) or (2), wherein the first conversion unit is configured to interleave the pieces of partial data included in the pieces of first observation data acquired for each radar echo to convert the pieces of first observation data into the pieces of second observation data, and the second conversion unit is configured to convert the pieces of second observation data into the pieces of first observation data by deinterleaving the pieces of partial data included in the pieces of second observation data.

(4)

The radar system according to item (3), wherein the first conversion unit is configured to interleave the pieces of partial data included in the pieces of first observation data based on at least one of arrangement of the transmitter antennas and the receiver antennas, an order in which the transmitter antennas transmit the radar signals, and a data size of the pieces of first observation data.

(5)

The radar system according to item (3) or (4), wherein the receiver antennas include first and second receiver antennas arranged spatially continuously, and the first conversion unit is configured to perform interleaving in such a way that a plurality of pieces of partial data included in first observation data acquired based on a radar echo received by the first receiver antenna and a plurality of pieces of partial data included in first observation data acquired based on a radar echo received by the second receiver antenna have discontinuity.

(6)

The radar system according to any one of items (3) to (5), wherein the receiver antennas include first and second receiver antennas, the pieces of partial data are arranged in chronological order in each of the pieces of first observation data, and the first conversion unit is configured to perform interleaving in such a way that a plurality of pieces of partial data arranged in a same chronological order among a plurality of pieces of partial data included in first observation data acquired based on a radar echo received by the first receiver antenna and a plurality of pieces of partial data included in first observation data acquired based on a radar echo received by the second receiver antenna have discontinuity.

(7)

The radar system according to any one of items (3) to (6), wherein the radar device and the processing device share a seed for rearranging the pieces of partial data, the first conversion unit is configured to perform interleaving based on the seed, and the second conversion unit is configured to perform deinterleaving based on the seed.

(8)

The radar system according to any one of items (1) to (7), wherein the radar device further includes a buffer configured to store the pieces of first observation data acquired each time the radar signal is transmitted from the transmitter antenna, and the first conversion unit is configured to convert the pieces of first observation data stored in the buffer into the pieces of second observation data.

(9)

The radar system according to any one of items (1) to (8), wherein the transfer unit is configured to sequentially transfer a plurality of packets generated from the pieces of second observation data according to a communication scheme adopted between the radar device and the processing device.

(10)

The radar system according to any one of items (1) to (9), wherein the first conversion unit is configured to convert the pieces of first observation data into the pieces of second observation data in such a way that pieces of partial data included in the same first observation data among the pieces of first observation data are not transferred in a same packet.

(11)

A data transfer device including:

a conversion unit configured to convert a plurality of pieces of first observation data output from a radar device and including a plurality of pieces of partial data having continuity into a plurality of pieces of second observation data including the pieces of partial data having discontinuity; and a transfer unit configured to transfer the pieces of second observation data to a processing device, wherein the processing device is configured to convert the pieces of second observation data into the pieces of first observation data and executes arithmetic processing using the pieces of first observation data.

(12)

A method executed by a radar system including a radar device and a processing device communicably connected to the radar device, the method including:

transmitting a radar signal;

receiving a radar echo based on a reflected wave of the transmitted radar signal;

acquiring a plurality of pieces of first observation data including a plurality of pieces of partial data having continuity based on the received radar echo;

converting the pieces of first observation data into a plurality of pieces of second observation data including the pieces of partial data having discontinuity;

transferring the pieces of second observation data from the radar device to the processing device;

converting the pieces of transferred second observation data into the pieces of first observation data; and executing arithmetic processing using the pieces of first observation data converted from the pieces of second observation data.

(13)

A method executed by a data transfer device, the method including:

converting a plurality of pieces of first observation data output from a radar device and including a plurality of pieces of partial data having continuity into a plurality of pieces of second observation data including the pieces of partial data having discontinuity; and transferring the pieces of second observation data to a processing device, wherein the processing device is configured to convert the pieces of second observation data into the pieces of first observation data and executes arithmetic processing using the pieces of first observation data.

What is claimed is:

1. A radar system comprising:

a radar device; and a processing device that is communicably connected to the radar device, wherein the radar device includes:

a plurality of transmitter antennas configured to transmit radar signals in a time division manner;

a plurality of receiver antennas configured to receive radar echoes based on reflected waves of the radar signals transmitted in a time division manner;

a first processor configured to:

acquire a plurality of pieces of first observation data, each including a plurality of pieces of partial data having temporal continuity, based on the received radar echoes;

convert the pieces of first observation data into a plurality of pieces of second observation data by interleaving the pieces of partial data included in the pieces of first observation data among themselves, such that, in each of the pieces of second observation data, the plurality of pieces of partial data have temporal discontinuity; and transfer the pieces of second observation data to the processing device, and the processing device includes a second processor configured to:

convert the pieces of second observation data into the pieces of first observation data by deinterleaving the pieces of partial data included in the pieces of second observation data; and execute arithmetic processing using the pieces of first observation data converted from the pieces of second observation data, wherein the plurality of receiver antennas include first and second receiver antennas, another antenna being disposed between the first and second receiver antennas, and each of the pieces of second observation data includes a first piece of partial data from one of the pieces of the first observation data acquired based on a radar echo received by the first receiver antenna and a second piece of partial data from one of the pieces of the first observation data acquired based on a radar echo received by the second receiver antenna.

2. The radar system according to claim 1, wherein the radar device includes a multi-input multi-output (MIMO) radar.

3. The radar system according to claim 1, wherein the first processor is configured to interleave the pieces of partial data included in the pieces of first observation data based on at least one of arrangement of the transmitter antennas and the receiver antennas, an order in which the transmitter antennas transmit the radar signals, and a data size of the pieces of first observation data.

4. The radar system according to claim 1, wherein the radar device and the processing device share a seed for rearranging the pieces of partial data, the first processor is configured to perform interleaving based on the seed, and the second processor is configured to perform deinterleaving based on the seed.

5. The radar system according to claim 1, wherein the radar device further includes a buffer configured to store the pieces of first observation data acquired each time the radar signal is transmitted from one of the transmitter antennas, and the first processor is configured to convert the pieces of first observation data stored in the buffer into the pieces of second observation data.

6. The radar system according to claim 1, wherein the first processor is configured to sequentially transfer a plurality of packets generated from the pieces of second observation data according to a communication scheme adopted between the radar device and the processing device.

7. The radar system according to claim 6, wherein the first processor is configured to convert the pieces of first observation data into the pieces of second observation data in such a way that pieces of partial data included in the same piece of first observation data among the pieces of first observation data are not transferred in a same packet.

8. A data transfer device that is communicably connectable to a radar device including a plurality of transmitter antennas configured to transmit radar signals in a time division manner and a plurality of receiver antennas configured to receive radar echoes based on reflected waves of the radar signals transmitted in a time division manner, the plurality of receiver antennas including first and second receiver antennas, another antenna being disposed between the first and second receiver antennas, the data transfer device comprising:

a first processor configured to;

convert a plurality of pieces of first observation data output from the radar device into a plurality of pieces of second observation data, the plurality of pieces of first observation data being acquired based on the received radar echoes and each including a plurality of pieces of partial data having temporal continuity, the first processor converting the plurality of pieces of first observation data into the plurality of pieces of second observation data by interleaving the pieces of partial data included in the pieces of first observation data among themselves, such that, in each of the pieces of second observation data, the plurality of pieces of partial data have temporal discontinuity; and transfer the pieces of second observation data to a processing device, wherein the processing device includes a second processor configured to convert the pieces of second observation data into the pieces of first observation data by deinterleaving the pieces of partial data included in the pieces of second observation data, and execute arithmetic processing using the pieces of first observation data converted from the pieces of second observation data, and wherein each of the pieces of second observation data includes a first piece of partial data from one of the pieces of the first observation data acquired based on a radar echo received by the first receiver antenna and a second piece of partial data from one of the pieces of the first observation data acquired based on a radar echo received by the second receiver antenna.

9. A method executed by a radar system comprising a radar device and a processing device communicably connected to the radar device, the radar device comprising at least one transmitter antenna and a plurality of receiver antennas including first and second receiver antennas and another antenna disposed therebetween, the method comprising:

transmitting, by the at least one transmitter antenna, radar signals in a time division manner;

receiving, by the plurality of receiver antennas, radar echoes based on reflected waves of the radar signals transmitted in a time division manner;

acquiring a plurality of pieces of first observation data, each including a plurality of pieces of partial data having temporal continuity, based on the received radar echoes;

converting the pieces of first observation data into a plurality of pieces of second observation data by interleaving the pieces of partial data included in the pieces of first observation data among themselves, such that, in each of the pieces of second observation data, the plurality of pieces of partial data have temporal discontinuity;

transferring the pieces of second observation data from the radar device to the processing device;

converting the pieces of transferred second observation data into the pieces of first observation data; and executing arithmetic processing using the pieces of first observation data converted from the pieces of second observation data, wherein each of the pieces of second observation data includes a first piece of partial data from one of the pieces of the first observation data acquired based on a radar echo received by the first receiver antenna and a second piece of partial data from one of the pieces of the first observation data acquired based on a radar echo received by the second receiver antenna.

10. A method executed by a processor of a data transfer device that is communicably connectable to a radar device including a plurality of transmitter antennas configured to transmit radar signals in a time division manner and a plurality of receiver antennas configured to receive radar echoes based on reflected waves of the radar signals transmitted in a time division manner, the plurality of receiver antennas including first and second receiver antennas, another antenna being disposed between the first and second receiver antennas, the method comprising, by the processor of the data transfer device:

converting a plurality of pieces of first observation data output from the radar device into a plurality of pieces of second observation data, the plurality of pieces of first observation data being acquired based on the received radar echoes and each including a plurality of pieces of partial data having temporal continuity, the plurality of pieces of first observation data being converted into the plurality of pieces of second observation data by interleaving the pieces of partial data included in the pieces of first observation data among themselves, such that, in each of the pieces of second observation data, the plurality of pieces of partial data have temporal discontinuity; and transferring the pieces of second observation data to a processing device, wherein the processing device includes a processor configured to convert the pieces of second observation data into the pieces of first observation data by deinterleaving the pieces of partial data included in the pieces of second observation data and execute arithmetic processing using the pieces of first observation data converted from the pieces of second observation data, and wherein each of the pieces of second observation data includes a first piece of partial data from one of the pieces of the first observation data acquired based on a radar echo received by the first receiver antenna and a second piece of partial data from one of the pieces of the first observation data acquired based on a radar echo received by the second receiver antenna.

11. The radar system according to claim 1, wherein the first processor is configured to interleave the pieces of partial data arranged in a time direction and a spatial direction.

12. The radar system according to claim 1, wherein each of the pieces of second observation data includes pieces of partial data from pieces of the first observation data acquired based on radar echoes received by non-adjacent receiver antennas among the plurality of receiver antennas and excludes pieces of partial data from pieces of the first observation data acquired based on radar echoes received by adjacent receiver antennas among the plurality of receiver antennas.

13. A radar system comprising:

a radar device; and a processing device that is communicably connected to the radar device, wherein the radar device includes:

a plurality of transmitter antennas configured to transmit radar signals in a time division manner;

a plurality of receiver antennas configured to receive radar echoes based on reflected waves of the radar signals transmitted in a time division manner; and a first processor configured to:

acquire a plurality of pieces of first observation data, each including a plurality of pieces of partial data having temporal continuity, based on the received radar echoes;

convert the pieces of first observation data into a plurality of pieces of second observation data by interleaving the pieces of partial data included in the pieces of first observation data among themselves, such that, in each of the pieces of second observation data, the plurality of pieces of partial data have temporal discontinuity; and transfer the pieces of second observation data to the processing device, and wherein the processing device includes a second processor configured to:

convert the pieces of second observation data into the pieces of first observation data by deinterleaving the pieces of partial data included in the pieces of second observation data; and execute arithmetic processing using the pieces of first observation data converted from the pieces of second observation data, wherein the plurality of receiver antennas include first and second receiver antennas, the pieces of first observation data include a first piece of first observation data including a plurality of pieces of first partial data and a second piece of first observation data including a plurality of pieces of second partial data, the pieces of first partial data are based on radar echoes received by the first receiver antenna, the radar echoes being received by the first receiver antenna at different times, the pieces of second partial data are based on radar echoes received by the second receiver antenna, the radar echoes being received by the second receiver antenna at different times, each of the pieces of second observation data includes a piece of the first partial data corresponding to a first time and a piece of the second partial data corresponding to a second time different from the first time.

14. The radar system according to claim 13, wherein each of the pieces of second observation data includes pieces of the first and second partial data corresponding to different times and excludes pieces of the first and second partial data corresponding to the same time.

* * * * *